US008271533B2

(12) United States Patent
Williams

(10) Patent No.: US 8,271,533 B2
(45) Date of Patent: Sep. 18, 2012

(54) COMPUTER DATABASE WITH ADAPTIVE STORAGE SPACE ARCHITECTURE

(76) Inventor: Allan Williams, Ottawa (CA)

( * ) Notice: Subject to any disclaimer, the term of this patent is extended or adjusted under 35 U.S.C. 154(b) by 1684 days.

(21) Appl. No.: 10/255,762

(22) Filed: Sep. 27, 2002

(65) Prior Publication Data

US 2004/0010503 A1     Jan. 15, 2004

(30) Foreign Application Priority Data

Jul. 15, 2002    (CA) .................................. 2391692

(51) Int. Cl.
*G06F 7/00*     (2006.01)
(52) U.S. Cl. ..................... 707/791; 707/792; 707/803
(58) Field of Classification Search ......... 711/5; 707/100, 707/10, 791, 792, 803, 737
See application file for complete search history.

(56) References Cited

U.S. PATENT DOCUMENTS

| | | | |
|---|---|---|---|
| 5,717,921 A | 2/1998 | Lomet | |
| 5,794,224 A | 8/1998 | Yufik | |
| 5,852,819 A * | 12/1998 | Beller ................................. | 1/1 |
| 6,173,073 B1 * | 1/2001 | Wang ............................. | 382/176 |
| 6,230,247 B1 | 5/2001 | Cannon | |
| 6,317,750 B1 * | 11/2001 | Tortolani et al. ...................... | 1/1 |
| 6,321,241 B1 * | 11/2001 | Gartung et al. ................ | 715/210 |
| 6,484,179 B1 * | 11/2002 | Roccaforte .................... | 707/737 |
| 2003/0084052 A1 * | 5/2003 | Peterson ........................ | 707/100 |
| 2004/0107200 A1 | 6/2004 | Sjogren | |

FOREIGN PATENT DOCUMENTS

EP     0 534 466 A2     3/1993

OTHER PUBLICATIONS

An Introduction to Database Systems, vol. II, C.J. Date (IBM Corporation), Addison-Wesley 1985.
Database for the Small Computer User, Tony Elbra NCC Publications, 1982.
Principles and Practice of Database Systems, S.M. Deen, MacMilan Publishers, 1985.

* cited by examiner

*Primary Examiner* — Belix M Ortiz
(74) *Attorney, Agent, or Firm* — Victoria Donnelly; IP-MEX Inc.

(57) ABSTRACT

A computer database having adaptive storage space architecture is provided. The database has a storage space architecture which has a grid having grid lines, intersections of the grid lines forming nodes which provide space for storing data, each node being assembled from a plurality of cells arranged in at least one group of cells forming a storage space structure of the node, each cell being suitable for storing simple data. Additionally, selected groups of cells within the nodes may be designated as replicable, i.e. being able to replicate itself in response to an external signal. A corresponding database processing unit for processing data stored in the database, a graphical user interface for input and output of the data, and method of forming the database are also provided.

66 Claims, 19 Drawing Sheets

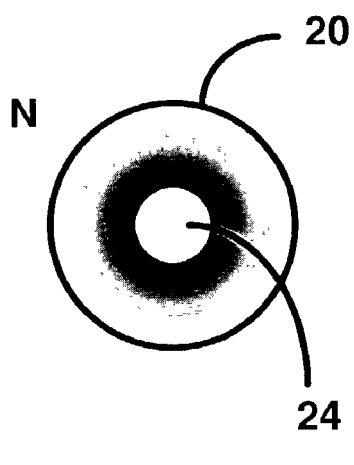
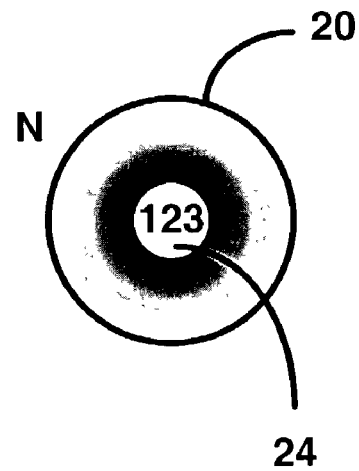
FIGURE 2A   FIGURE 2B

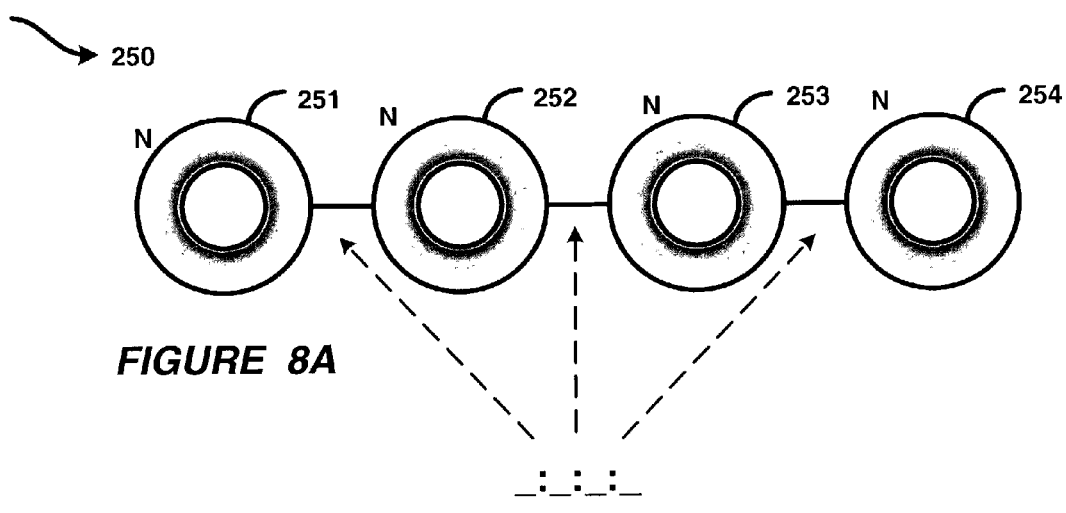
FIGURE 8A
FIGURE 8B
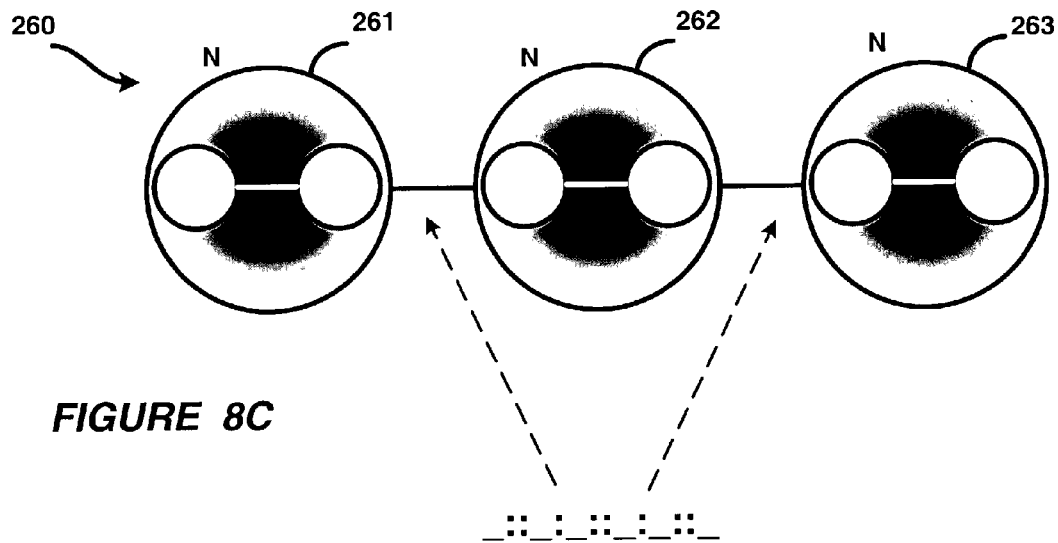
FIGURE 8C
FIGURE 8D

COMPUTER DATABASE WITH ADAPTIVE STORAGE SPACE ARCHITECTURE

FIELD OF INVENTION

The invention relates to computer databases, and in particular to a computer database having adaptive storage space architecture.

BACKGROUND OF THE INVENTION

Contemporary databases are built around the notion of table as the main structural unit of the storage space, designed to store in an organized manner relatively simple data, like numbers, symbols, strings etc. The table has a set of rows and columns, intersection of which forms cells, being the smallest storage units for storage and retrieval of actual data.

When the need arises to store in such a database more complex data, internal structure of which cannot be ignored during database operations, the most popular approach is to spread the complex data components over several table columns specially designated for this purpose. When warranted by the complexity of the data, additional tables can be created as required for accommodating all the data components and relations between them. Various implementations of this idea differ by the way the tables are created, columns are designated and data are spread over them etc., but table still remains the foundation on which the databases are built upon.

Such databases have gained widespread popularity due to a number of advantages they offer. They are built on a solid mathematical foundation, they are powerful and quick on the response to the data request, their size may vary from tiny personal database to a gigantic database, easily serving the needs of a big enterprise, and they are reliable and relatively simple in implementation. A detailed review of the database design can be found, e.g. in a textbook by Deen, S. M. "Fundamentals of Data Base Systems", The Macmillan Press Ltd., 1977, or in a textbook by Date, C. J. "An Introduction to Database Systems" Volume II, Addison-Wesley Publishing Company, 1985.

However, it is getting more and more evident that some of their features, presumably considered as advantages, in many cases turn out being shortcomings. For example, with ever increasing complexity of data to be stored in the database, fitting complex data into a table quickly becomes awkward and cumbersome to achieve. A table lacks mechanisms for storing complex data, because it was not designed for this purpose. Another shortcoming shows up when there is a need to store data of variable complexity in the database. Normally, when designing a database, users have to decide how many tables is necessary to create, what columns should be in each table, what types of data will be put into them, etc. Unfortunately, in many cases, exact structure of the table(s), e.g. number of columns in the table, cannot be determined at the database design stage it will be known only at run time, i.e. when the database is populated with actual data. For example, some columns of the table might be designated to store names of authors of an article in a scientific journal. The actual number of authors is not known in advance, so the required number of columns in the table cannot be determined until the data entry begins, which is evidently too late. The fact that the number of authors can be different for different articles complicates the situation even further. At some point, the actual number of authors might exceed the number of columns designated for this purpose. As a result, some data should be dropped, or the database has to be redesigned and re-populated again if the complete list of authors needs to be maintained in the database. The above-mentioned example is just one illustration of numerous situations caused by the need of fitting complex data into a simple table structure.

Clearly, there is a need in the industry for the development of alternative database design principles and architecture, which would overcome the above-mentioned and other similar shortcomings of current databases.

SUMMARY OF THE INVENTION

Therefore there is an object of the invention to provide a computer database, which would have adaptive storage space architecture suitable for storing complex data, and would obviate or avoid the above-mentioned drawbacks.

According to one aspect of the invention there is provided a computer database, having a data storage space architecture comprising a grid having grid lines, intersections of the grid lines forming nodes which provide space for storing data, each node being one of the permanent type node whose storage space structure is permanent, and a variable type node whose storage space structure is capable of changing in response to an event.

Conveniently, the storage space structure of each node comprises a plurality of cells forming at least one group of cells, each cell being suitable for storing simple data. For the variable type node, said group of cells within the node is capable to replicate itself in response to the event, e.g. an external signal. Beneficially, the group of cells is capable to replicate itself in response to the event in real-time, e.g. in response to a user's request during database input/output operations. The updated database storage space architecture including the replicated group of cells may be stored in a permanent computer storage medium, e.g. computer hard drive, or in a temporary computer storage medium, e.g. computer random access memory (RAM).

Advantageously, the data storage space architecture is two-dimensional including a two-dimensional grid. Alternatively, the data storage space architecture may include a three-dimensional grid, or a grid of a higher dimension for storing even more complex data.

Depending on the structure of data to be stored, the storage space of the nodes may conveniently comprise a plurality of cells is one of the following:
  a single cell (Single-cell (SC) node);
  a sequence of cells (Multi-cell (MC) node); and
  a sequence of sequences of cells (Multi-sequence (MS) node).

For the variable type SC node, the single cell is capable to replicate itself in response to the event, while for the variable type MC node, the sequence of cells is capable to replicate itself in response to the event. Similarly, for the variable type MS node, a sequence of cells of the sequence of sequences of cells is capable to replicate itself in response to the event to generate a replica thereof.

If the grid of the data storage space architecture is a two-dimensional grid, the has a first plurality of grid lines arranged substantially along one direction, and a second plurality of grid lines arranged substantially along another direction and intersecting the first plurality of lines. It is convenient to define a database record of such database as a sub-set of nodes arranged along one of the grid lines from the first plurality of lines. Alternatively the database record may be defined as a sub-set of nodes arranged along one of the grid lines from the second plurality of lines. For example, if the grid lines are arranged substantially along horizontal and vertical directions, the database record may include nodes arranged along one of the horizontal lines. Alternatively, the database record may be defined as having nodes arranged along one of the vertical lines.

To process data to be stored in the database described above, a corresponding database processing unit comprising a computer readable program code means for performing database operations is provided. The database processing unit performs one or more of the database operations:

storing the data in the storage space of the nodes of the data storage space architecture of the computer database;

retrieving the data from the storage space of the nodes of the data storage space architecture of the computer database; and processing the data retrieved from the storage space of the nodes of the data storage space architecture of the computer database.

The database processing unit also comprises a computer readable program code means for performing one or more of the following operations:

adding a new database record;

deleting the database record;

updating the database record, comprising replicating the group of cells within the node; and searching through the database records;

generating a report by gathering information from the database records; and generating a reminder associated with the data stored in the database record.

Additionally, the database processing unit also comprises a computer readable program code means for maintaining information about current storage space structure of the nodes.

Thus, in combination, there is provided the computer database as described above; and a database processing unit comprising a computer readable program code means for performing database operations with data to be stored in the storage space of the nodes of the data storage space architecture of the described computer database.

Additionally, the combination of the computer database and the database processing unit may further include a graphical user interface (GUI) unit comprising computer readable program code means for input and output of the data to be stored in the database. Conveniently, the computer readable program code means for the input and output of the data comprises computer readable program code means for preparing and displaying the data storage space structure of the nodes on a computer screen.

The computer database described above may be conveniently designed for storing data related to one or more of the following:

intellectual property, comprising:

patents;

trademarks;

non-disclosure agreements;

contracts, including licensing contracts;

domain names;

restricted distribution of documents;

human resources;

inventory; and finance.

Two or more computer databases described above may be combined into a computer database system, further comprising:

a database processing unit having a computer readable program code means for performing database operations with data to be stored in the storage space of the nodes of the computer databases; and a graphical user interface unit comprising a computer readable program code means for input and output of the data to be stored in the databases, comprising means for preparing and displaying the storage space structure of the nodes on a computer screen.

Preferably, the databases of the system use the same data processing unit for performing database operations and the same graphical user interface unit for input/output of the data.

According to another aspect of the invention there is provided a computer database having a data storage space architecture, comprising a grid having grid lines, intersections of the grid lines forming nodes which provide space for storing data, each node being assembled from a plurality of cells arranged in at least one group of cells forming a storage space structure of the node, each cell being suitable for storing simple data.

Beneficially, the storage space structure of the nodes is variable between the nodes, e.g. including different number of cells and providing different arrangement of the cells into groups.

Conveniently, the data storage space architecture of the database is two-dimensional including a two-dimensional grid.

Depending on the structure of data to be stored, the group of cells of the plurality of cells may be selected as one of the following:

a single cell (Single-cell (SC) node);

a sequence of cells (Multi-cell (MC) node); and a sequence of sequences of cells (Multi-sequence (MS) node).

To provide an adaptive storage space for the node, the single cell may be designated as replicable, is capable to replicate itself in response to the event. Similarly, the sequence of cells may be designated as replicable, is capable to replicate itself in response to the event, the sequence of cells to be replicated being part of one of the Multi-cell (MC) and Multi-sequence (MS) node.

Advantageously, at least one of the nodes of the computer database described above is a variable type node whose storage space structure is capable of changing in response to an event. The storage space structure of the node may be changed so that the group of cells within the node replicates itself in response to the event, e.g. in real-time. The updated storage space structure of the nodes, including the replicated group of cells may be stored in a permanent computer storage medium, e.g. hard drive, or in a temporary computer storage medium, e.g. RAM.

For the two-dimensional grid, having a first plurality of lines arranged substantially along one direction, and a second plurality of lines arranged substantially along another direction and intersecting the first plurality of lines, a database record may be conveniently defined as one of the following:

nodes arranged along one of the lines from the first plurality of lines; and nodes arranged along one of the lines from the second plurality of lines.

To process the data to be stored in the database described above, a corresponding database processing unit comprising a computer readable program code means for performing database operations is provided. The database unit performs one or more of database operations selected from the group:

storing the data in the storage space of the nodes of the data storage space architecture of the computer database described above;

retrieving the stored data; and processing the retrieved data.

The database processing unit also comprises a computer readable program code means for performing one or more of the following database operations:
- adding a new database record;
- deleting the database record;
- updating the database record, comprising replicating the group of cells within the node; and
- searching through the database records;
- generating a report by gathering information from the database records; and
- generating a reminder associated with the data stored in the database record.

Additionally, the database processing unit comprises a computer readable program code means for maintaining information about current storage space structure of the nodes.

Thus, in combination, there is provided the computer database described above; and
- a database processing unit comprising a computer readable program code means for performing database operations with data to be stored in the storage space of the nodes of the data storage space architecture of the computer database.

Additionally, the above combination of the computer database and the database processing unit comprises a graphical user interface unit for the computer database, comprising a computer readable program code means for input and output of the data to be stored in the storage space of the nodes of the data storage space architecture of the database. Beneficially, the computer readable program code means for the input and output of the data comprises computer readable program code means for preparing and displaying the data storage space structure of the nodes on a computer screen.

The computer database described above may be conveniently designed for storing data related to one or more of the following:
- intellectual property, comprising:
  - patents;
  - trademarks;
  - non-disclosure agreements;
  - contracts, including licensing contracts;
  - domain names;
  - restricted distribution of documents;
- human resources;
- inventory; and
- finance.

Two or more databases described above may be combined into a computer database system, further comprising:
- a database processing unit having a computer readable program code means for performing database operations with data to be stored in the storage space structure of the nodes of the computer databases; and
- a graphical user interface unit comprising a computer readable program code means for input and output of the data to be stored in the databases, comprising means for preparing and displaying the storage space structure of the nodes on a computer screen.

Preferably, the databases of the computer database system use the same data processing unit and the same graphical user interface unit.

According to another aspect of the invention there is provided a method of forming a computer database, comprising the steps of:
- forming a data storage space architecture comprising:
  - forming a grid having grid lines, intersections of the grid lines forming nodes, which provide space for storing data;
  - designating each node as being one of the permanent type nodes whose storage space structure is permanent, and a variable type node whose storage space structure is capable of changing in response to an event.

The method further comprises the step of changing the storage space structure of the variable type node in response to the event, e.g. an external signal.

The step of forming the data storage space architecture further includes the step of forming the storage space structure of each node so that the node is comprised of a plurality of cells combined into at least one group, each cell being suitable for storing simple data. Conveniently, the step of changing comprises replicating said at least one group of cells in response to the event.

The step of forming the grid conveniently comprises forming a two-dimensional grid having a first plurality of lines arranged substantially along one direction, and a second plurality of lines arranged substantially along another direction and intersecting the first plurality of lines.

The step of forming the data storage space architecture further comprises the step of defining a database record as one of the following:
- nodes arranged along one of the lines from the first plurality of lines; and
- the nodes arranged along one of the lines from the second plurality of lines.

According to yet another aspect of the invention there is provided a method of forming a computer database comprising the steps of:
- forming a data storage space architecture, comprising:
  - forming a grid having grid lines, intersections of the grid lines forming nodes, which provide space for storing data;
  - forming a storage space structure of each node by assembling the node from a plurality of cells arranged in at least one group, each cell being suitable for storing simple data.

Conveniently, the step of forming the storage space structure of the node comprises forming the storage space structure of the node so that the storage space structure of the nodes is variable between the nodes.

Depending on the structure of the data to be stored in the database, the step of forming the storage space structure of the node may comprise assembling the node from the plurality of cells which is one of the following:
- a single cell (Single-cell (SC) node);
- a sequence of cells (Multi-cell (MC) node); and
- a sequence of sequences of cells (Multi-sequence (MS) node).

Additionally, the step of forming the storage space structure of the node may comprise designating at least one of the SC nodes as replicable, in which the single cell is capable to replicate itself in response to an event.

Similarly, the step of forming the storage space structure of the node comprises designating at least one of the MC and MS nodes as replicable, in which the sequence of cells is capable to replicate itself in response to the event.

Beneficially, in the method described above, the step of forming the storage space structure of the node comprises designating at least one of the nodes as a variable type node whose storage space structure is capable of changing in response to an event, e.g. designating at least one group of cells within the variable type node as capable to replicate itself in response to the event. The method further comprises the step of replicating the group of cells in response to the event.

Conveniently, the step of forming the grid comprises forming a two-dimensional grid having, which further comprises providing a first plurality of lines arranged substantially along one direction, and a second plurality of lines arranged substantially along another direction and intersecting the first plurality of lines; and the step of forming the data storage space architecture further comprises defining a database record as one of the following:

the nodes arranged along one of the lines from the first plurality of lines; and the nodes arranged along one of the lines from the second plurality of lines.

A graphical user interface (GUI) for the computer database of claim 1, comprising a computer readable program code means for input and output of data to be stored in the storage space of the nodes of the data storage space architecture of the computer database described above and modifications thereof is also provided. Beneficially, wherein the computer readable program code means for the input and output of the data comprises a computer readable program code means for preparing and displaying the storage space structure of the nodes on a computer screen.

Conveniently, the means for displaying comprises a plurality of GUI sections on the screen, each GUI section corresponding to the node of the data storage space architecture. The GUI section, corresponding to the variable type node, has a replicable area, which is capable to replicate itself in response to the event. The GUI further comprises a means for requesting replication of the replicable area.

Conveniently, GUI comprises a means for displaying information relating to the database record on a computer screen, including a plurality of GUI sections for receiving information and instructions relating to the database record, each GUI section corresponding to the node of the data storage space architecture, the GUI section corresponding to the variable type node having a replicable area, which is capable to replicate itself in response to the event, the replicable area corresponding to the replicable group of cells within the node.

According to one more aspect of the invention there is provided a graphical user interface (GUI) for input and output of data to be stored in a computer database, comprising means for displaying a database record on a computer screen, comprising a plurality of GUI sections for receiving information and instructions relating to the database record, at least one GUI section having a replicable area, which is capable to replicate itself in response to an event, e.g. an external signal.

The GUI further comprises means for generating the external signal to trigger the replication of the replicable area within the GUI section, comprising a means for triggering replication of the replicable area within the GUI section in real-time, e.g. during input/output operations.

Conveniently, the replicable area of the GUI section may be also collapsible, i.e. capable of hiding and displaying the replicable area on user's request.

The GUI as described above may be used for a variety of databases, e.g. for displaying a database record including patent related information. Conveniently, the database record including patent related information comprises one or more of the following replicable areas:

area for inventorship information;
  area for assignee information;
  area for patent application information;
  area for corresponding prior filed application;
  area for outsourcing and responsible attorney information;
  area for patent evaluation information;
  area for financial information;
  area for reminders associated with the record;
  area for maintenance fees; and
  area for recording a file history of the correspondence with the Patent Office.

Alternatively, the GUI may be used for displaying the database record is a record including trademark related information. Conveniently, the database record including trademark related information comprises one or more of the following replicable areas:

area for assignee information;
  area for trademark application information;
  area for corresponding prior filed applications;
  area for outsourcing and responsible attorney information;
  area for financial information;
  area for reminders associated with the record;
  area for maintenance fees; and
  area for recording a file history of the correspondence with the Trademark Office.

Yet alternatively, the GUI may be used for displaying the database record including contract related information. Conveniently, the record including contract related information comprises one or more of the following replicable areas:

area for effective and expiry dates of the contract;
  area for business and technical contact information;
  area for financial information;
  area for reminders associated with the contract; and
  area for recording a history of actions related to the contract.

The database described above, including modifications thereof may be used on a stand-alone computer, or in a network environment, e.g. in local area network (LAN), in a corporate Intranet environment, or the Internet environment.

The computer database described above has the following advantages. It has the database architecture which is more flexible for storing and processing complex data compared to other currently known solutions due to its adaptive data storage space architecture, where the nodes may have arbitrary complex storage space structure corresponding to the structure of the data to be stored. Moreover, an introduction of nodes having different and complex structure doe not destroys the structural integrity of the grid, and hence the database storage space architecture itself. The introduction of replicable groups of cells within the nodes increases this flexibility even further by allowing the nodes, and consequently a database record, to be of variable size to accommodate the additional data if needed. For small size databases, the changes of the size of the record (the addition of replicable cells) may be performed on the fly, i.e. in real-time in response to a user's request. The system of databases, including a number of databases having this storage space architecture, has a great flexibility of managing and updating separate databases. By using the same data processing unit and graphical user interface for all databases of the system, i.e. by using same data processing unit and GUI, it is easy to add a new database or to delete the existing database without affecting any existing databases. At the same time, the storage space architecture and the actual data for each database are stored separately from each other and from the data processing unit, which minimizes interaction between the databases, and hence errors involved. Such a convenient design of the database system, having a plurality of single databases, facilitates operation of different databases as all of them have similar and intuitive interface and same set of database operation, which makes the learning curve how to operate each next database very fast and practically not existing.

BRIEF DESCRIPTION OF THE DRAWINGS

Embodiments of the invention will now be described, by way of example, with reference to the accompanying drawings in which:

FIG. 2A illustrates a storage space structure of a single-cell node (SC-node);

FIG. 2B illustrates the SC-node of FIG. 2A storing simple data;

FIGS. 8A and 8C illustrate a storage space structure of two exemplary database records;

FIGS. 8B and 8D show two portions of a program code of a template corresponding to the storage space structure of the records of FIGS. 8A and 8C respectively;

DETAILED DESCRIPTION OF THE PREFERRED EMBODIMENTS

Figure 1:
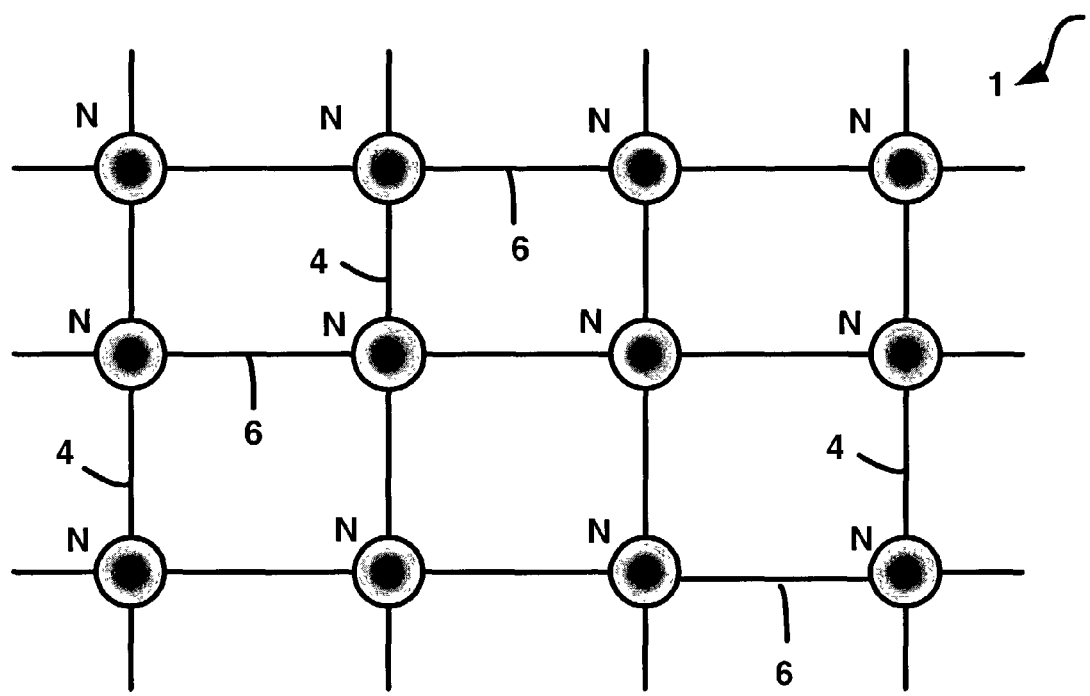
FIG. 1 illustrates data space storage space architecture in the form of a grid of the computer database of the embodiments of the invention.

Data storage space architecture of a computer database of the first embodiment is illustrated in FIG. 1. It is based upon the notion of a two-dimensional grid 1 (or lattice) having a plurality of grid lines 4 arranged substantially along one direction (a vertical direction in FIG. 1), and another plurality of grid lines 6 arranged substantially along another direction (a horizontal direction in FIG. 1), intersection of the grid lines forming nodes "N", which provide space for storing data. Nodes "N" of the grid 1 can be made arbitrary complex by assembling them from storage space building units, capable of accommodating simple types of data. The data are considered to be simple, when their internal structure, if any, is irrelevant for storage/retrieval operations. Examples of such data are numbers, symbols, strings etc. We will further refer to the storage space building units as cells, since their behavior, as will be shown below, to a certain extent resembles a behavior of their biological cousins. For example, cells may be combined into groups of cells as required for fitting the complex data in, and/or replicate themselves in response to the changes in the complexity of the data to be stored.

The number of cells within each node and their internal arrangement may vary from node to node, depending on the complexity of data the node is supposed to accommodate. Although in FIG. 1 all anodes are collectively designated by letter "N" to illustrate their positions at the intersections of the grid, different reference numerals will be used below to designate different types of nodes to distinguish between the nodes having different storage space structure.

For example, it is sufficient to allocate just one cell for storing simple data like title of the book. We will refer to such node as a single cell node (SC-node) 20 illustrated in FIGS. 2A and 2B. FIG. 2A shows the SC-node 20 having one empty cell 24 for storing data, and FIG. 2B shows the same node 20 storing a number "123".

Figures 3A, 3B:
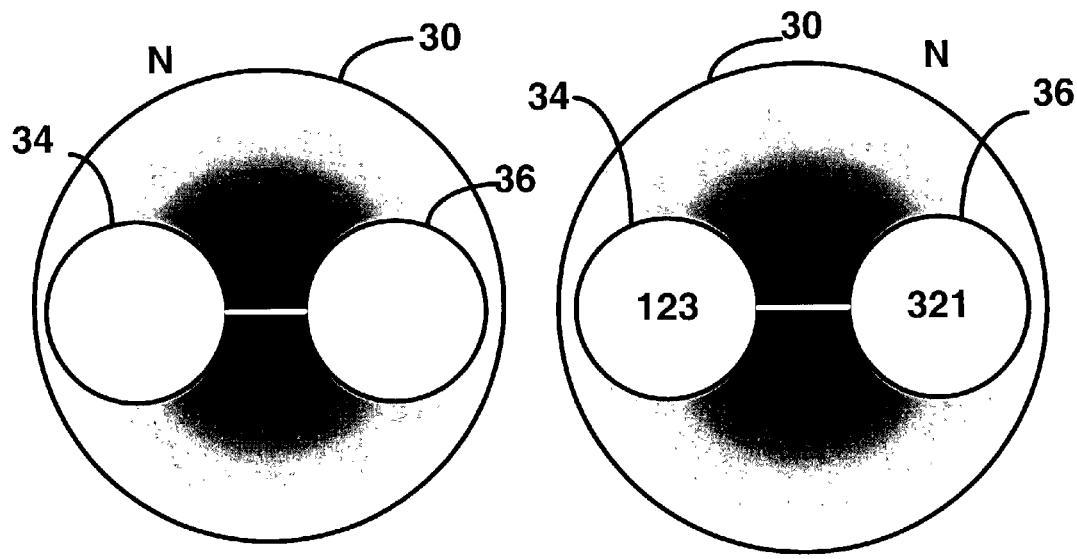
FIG. 3A illustrates a storage space structure of a Multi-cell node (MC-node)
FIG. 3B illustrates the MC-node if FIG. 3A storing simple data.

More complicated data may require assembling the node from a plurality of cells. For example, an organization may assign two reference numbers to a document, one for internal purposes, and another one for the use outside of the organization. Each number can be easily stored in a separate SC-node. However, in some cases, both numbers can be dealt with as if they were representing a single entity, which suggests storing them in one node instead of two. To enjoy the flexibility in dealing with the two reference numbers as a single entity or several separate entities, it is convenient to introduce a single composite reference number having two components, corresponding to the internal and external reference numbers respectively. To store such composite number in a single node, the node has to be assembled from two cells. In more complicated cases the nodes may be assembled from a plurality of cells arranged in groups. We will refer to such node as a multi-cell node, or a MC-node. An example of the MC-node 30, having its storage space assembled from a group of two cells 34 and 36, is shown in FIGS. 3A and 3B. FIG. 3A shows the storage space structure of the node 30 itself, while FIG. 3B shows the same node 30 where the cells store simple data, namely the cell 34 is storing a number "123", and the cell is storing a number "321".

Figure 4A:
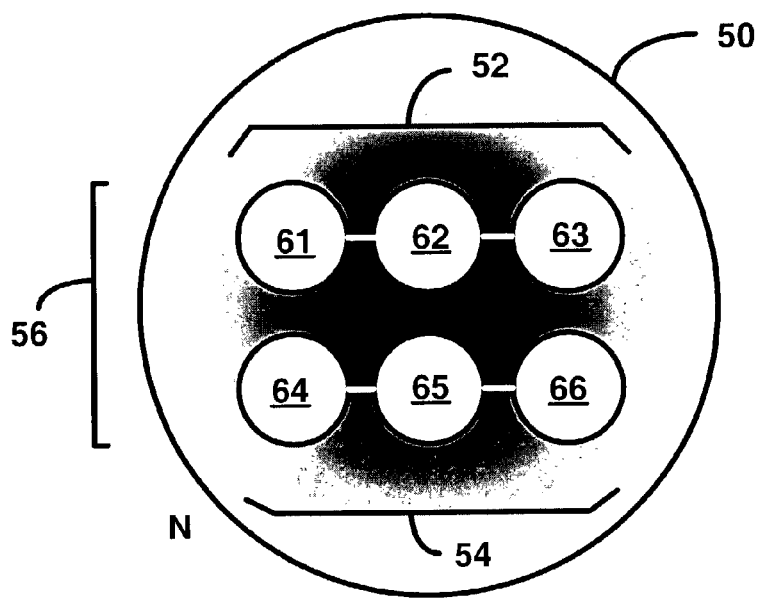
FIG. 4A illustrates a storage space structure of a Multi-Sequence node (MS-node)
Figure 4B:
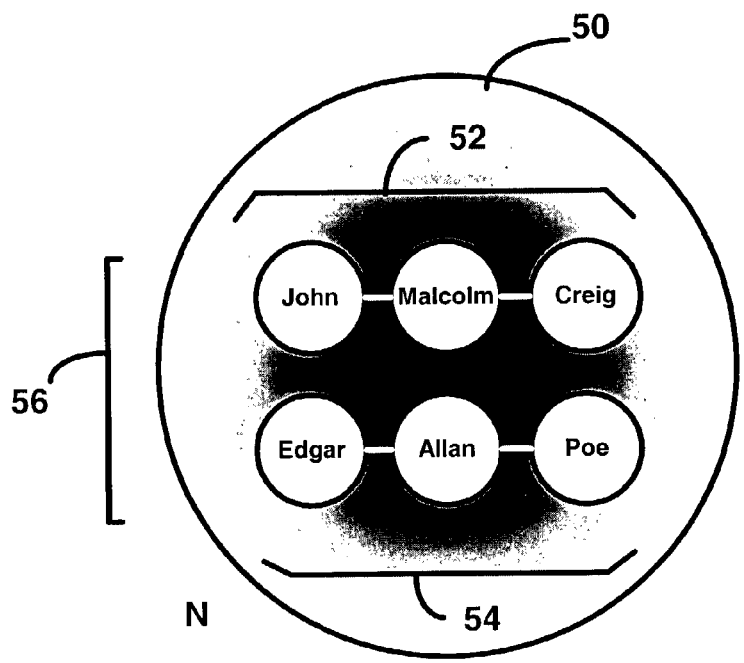
FIG. 4B illustrates the MS-node of FIG. 4A storing simple data.

More complicated data may require assembling the node from a larger number of groups of cells, e.g. from several similar sequences of cells. For example, a book can be written by two authors, each author having first name, middle name and family name. Each name of an author constitutes simple data, and therefore can be easily stored in a cell. To store full identification of the author, a sequence of three cells is needed. Two authors of the book will be represented by two such sequences, which all have exactly the same number and meaning of their corresponding cells. All subsequent sequences of cells can be considered as copies, or replicas, of the very first sequence. Again, to provide flexibility in dealing with the names of the authors either as a single entity or several separate entities, it is convenient to introduce a single composite name of the author having two components, each component representing one author and being composed of the author's first, middle and family names. To store such composite name in a single node, the node has to be assembled from two sequences of cells, each sequence including three cells. In more complicated cases more cells in a sequence and/or more sequences of cells may be needed. We will refer to such node having as a multi-sequence node, or MS-node. An example of the MS-node 50 is illustrated in FIGS. 4A and 4B. The storage space of the node 50 includes a first sequence of cells 52 and a second sequence of cells 54, which in combination, form a sequence of sequences of cells 56. The number of cells in each sequence and the meaning of each cell in the sequence are the same for both sequences. In more detail, the sequence 52 includes cells 61, 62 and 63, and the sequence 54 includes cells 64, 65 and 66, of which cells 61 and 64 are designated to store first names of the first and second author respectively, cells 62 and 65 are designated to store middle names of the first and second authors respectively, and cells 63 and 66 are designated to store last names of the first and second authors respectively. The node 50 where cells 61 to 66 are populated with the names of the authors (John Malcolm Creig and Edgar Allan Poe) is shown in FIG. 4B.

By changing the number of sequences of cells in a node and/or the number of cells in a sequence as required, the node structure can be further adapted to the complexity of the data to be stored.

It is understood that the above examples of the node storage space structure are merely illustrative, and cells may be arranged into groups within the nodes in a variety of ways as may be required for storing complex data.

Figure 5:
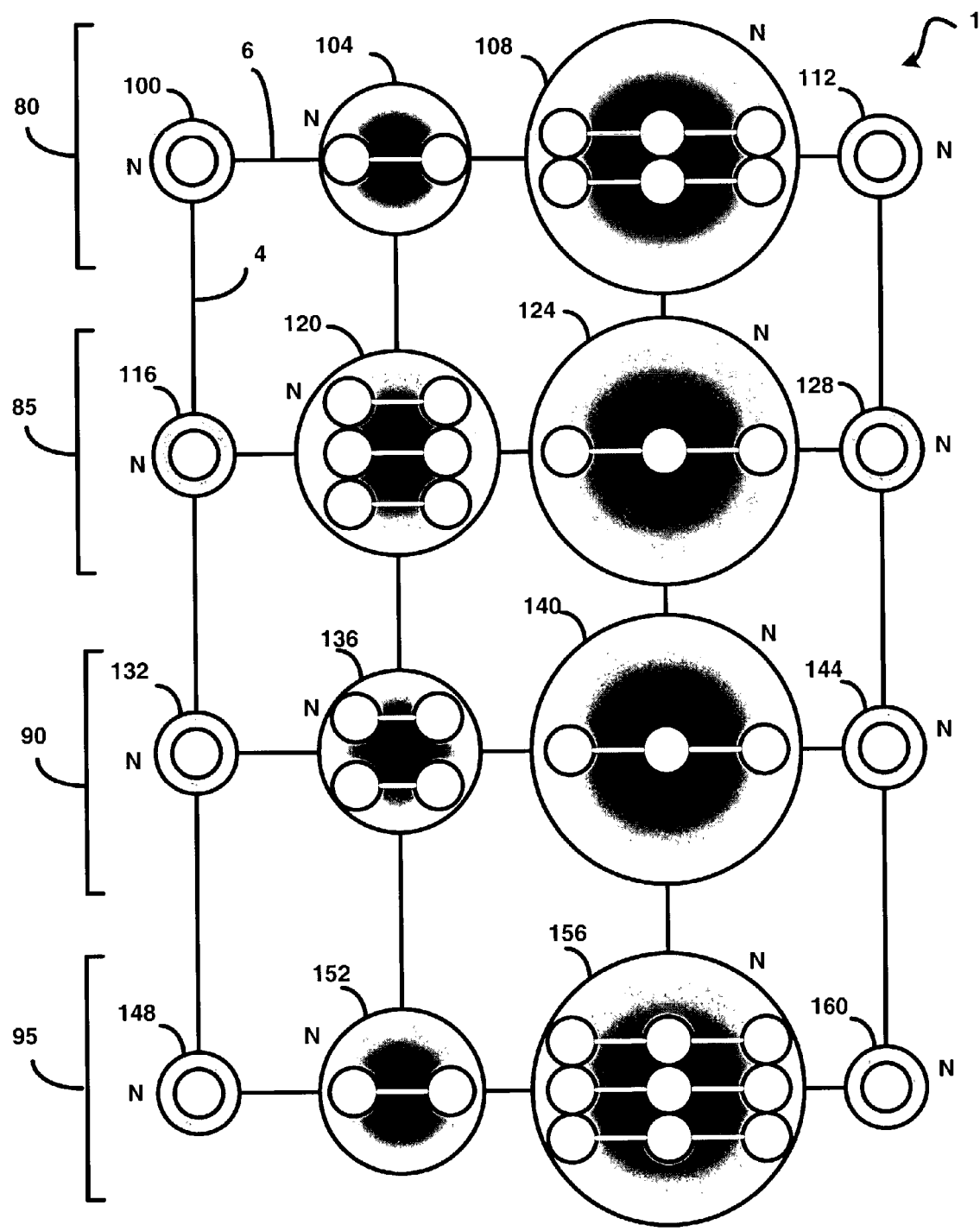
FIG. 5 is an illustrative example of the data storage space architecture including nodes with different storage space structure.

When the storage space structure of the nodes is defined, the arrangement of the nodes into the grid architecture may look like, e.g. an exemplary arrangement shown in the FIG. 5. It is seen that the storage space structure of the nodes may be variable between the nodes, and the number of cells within the nodes may also vary. It is convenient to define a database record as a sub-set of nodes arranged along one of the horizontal grid lines 6 of the grid. For example, the data storage space architecture including grid 1 of FIG. 5 has four records 80, 85, 90 and 95, each record comprising four nodes. The database record 80 includes a SC-node 100, a MC-node 104 having two cells, a MS-node 108 having two sequences of cells, each sequence of three cells, and another SC-node 112. The database record 85 includes a SC-node 116, a MS-node 120 having three sequences of cells, two cells in each sequence, a MC-node 124 having three cells, and another SC-node 128. The database record 90 includes a SC-node 132, a MS-node 136 having two sequences of cells, two cells in each sequence, a MC-node having three cells, and a SC-node 144. The last record 95 includes a SC-node 148, a MC-node 152 of two cells, a MS-node 156 having three sequences of cells, three cells in each sequence, and another SC-node 160.

The data storage space architecture in the form of the grid 1 of FIG. 5 might remind those with background in physics or chemistry a crystal lattice with certain atoms, or groups of atoms, placed in its nodes. It is not by chance that nature favors crystal lattice as a way of bringing order into the arrangement of atoms. Leaving aside discussion of physical reasons for that, instead, we concentrate on several advantages offered by such arrangement relevant to the purposes of current invention:

- Groups of atoms, placed in the nodes of the lattice, can be of virtually arbitrary complexity;
- Different nodes of the lattice can be composed of different groups of atoms;
- Integrity of the lattice does not depend upon the complexity of the groups of atoms, placed in its nodes, i.e. the lattice does not turn into something else when more complicated group of atoms is placed into its nodes.

Figure 6:
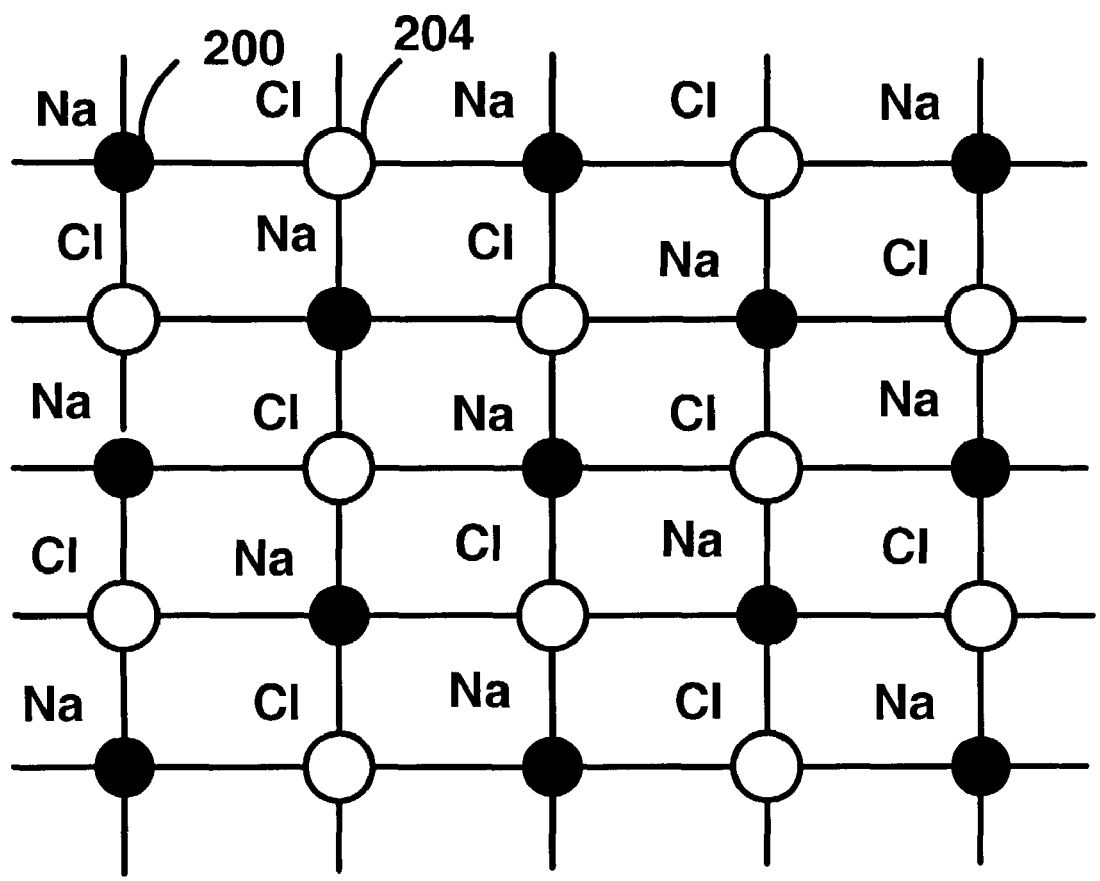
FIG. 6 illustrates a crystal lattice of an ordinary table salt.

For example, crystal lattice of the ordinary table salt (FIG. 6) is built of rather simple nodes, each node being a single atom of either Na (200) or Cl (204). The nodes of the crystal lattice of another well-known substance, an ordinary sugar, are built from so many atoms that it would not be feasible to show a fragment of the lattice here.

It turned out that by organizing the storage of data in the nodes in the lattice-like data storage space as described above we could enjoy similar advantages of being able to store data of various degrees of complexity (from simple to more complex data), and even data of the variable complexity (whose structure may be changed during input/output operations and may vary between the records and/or may vary for the same record over time), while maintaining integrity of the lattice-like structure at all times.

We will refer now to FIGS. 1 and 5 again and will continue to describe the principles of designing the database according to the first embodiment of the invention in further detail. In addition to the providing of a variety of nodes "N" having a flexible storage space structure corresponding to the structure of the data to be stored in the database, each of the nodes "N" is designated as being one of the permanent type node whose storage space structure is permanent, and a variable type node whose storage space structure is capable of changing in response to an event, e.g. in response to an external signal such as user's request. For the variable type node, the changing is performed so that the group of cells of the node storage space replicates itself to generate a replica thereof. For example, for the variable SC-node, the single cell is capable to replicate itself, while for the variable MC-node, the sequence of cells is capable to generate a replica thereof in response to the event, thus converting the MC-node into the MS-node. For the variable MS-node, a sequence of cells of the sequence of sequences of cells may be replicated, thus increasing the number of sequences within the MS-node by one. Conveniently, the similarity in the structure of the sequences of cells in the MS-nodes allows the changing of the number of the sequences in any given MS-node to be done quickly and efficiently, e.g. in real-time on the fly, i.e. at the request of a user during data entry.

Figure 7:
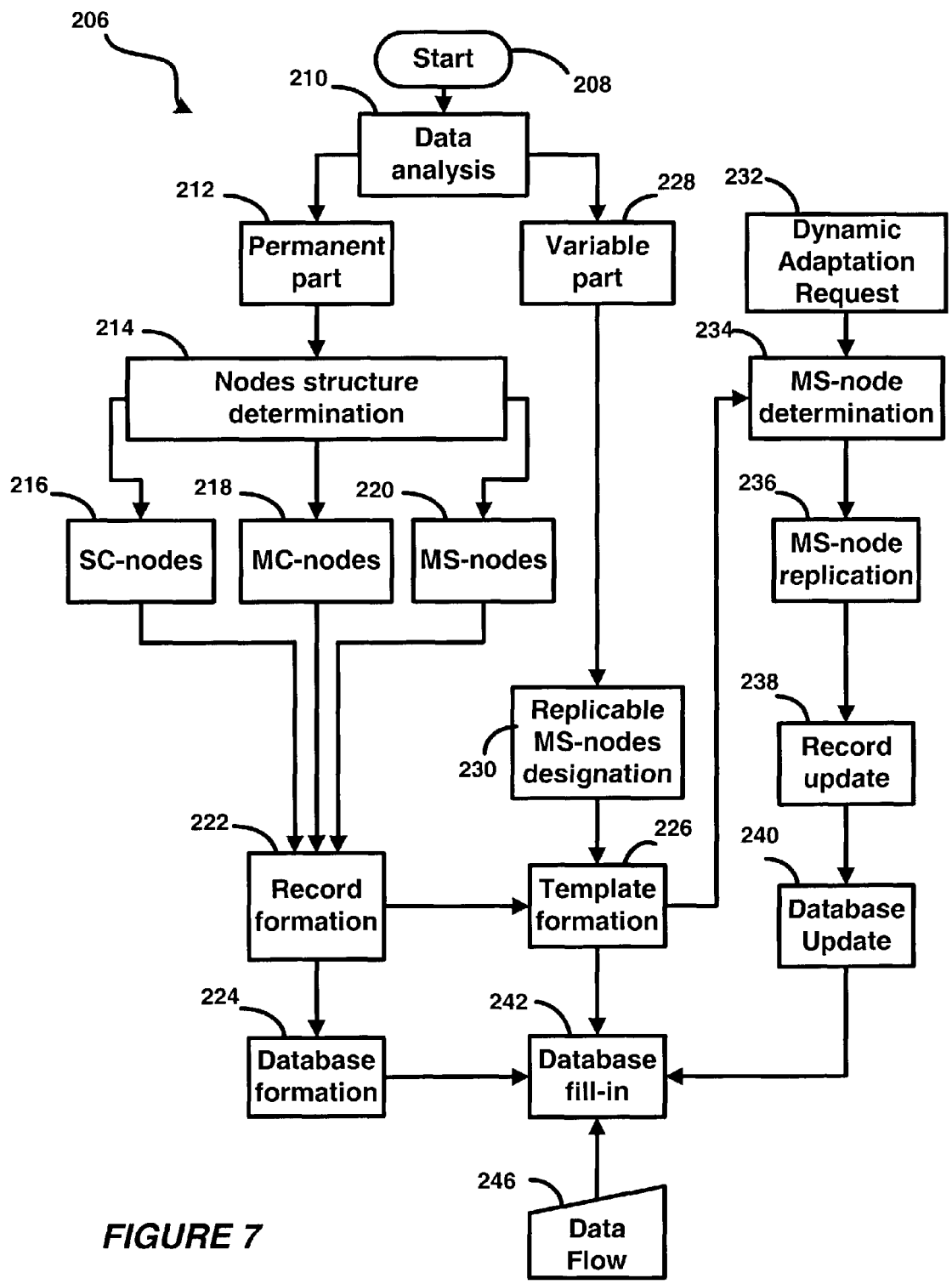
FIG. 7 is a flow-chart illustrating a process of designing the database of the first embodiment of the invention.

FIG. 7 shows a flow-chart 206 illustrating a process of designing the database of the first embodiment of the invention, which includes the following steps. Upon start (box 208), the data to be stored in the database is analyzed (box 210) to determine a variable part of the data, i.e. data that are likely to change their complexity at the request of a user during data entry. The rest of the data are considered to be of the permanent complexity. For example, names of inventors are considered to belong to the variable part, since different inventions can be characterized by different number of inventors. However, title of the invention is considered to belong to the permanent part, since the invention has one title only. Both parts are handled separately and in a different way. The data belonging to the permanent part is further analyzed (box 212) to determine one or more data building blocks, each block relating to a logical unit of information. Then, the number and structure of nodes that can accommodate all of the data blocks is determined in box 214, the nodes being one of the SC-nodes (box 216), MC-nodes (box 218) and MS-nodes (box 220). Nodes arranged along one of the horizontal grid lines, provide a storage space for the logical unit of information referred to as record (box 222). A set of records forms a database (box 224). To maintain information about permanent part of the data storage space architecture, influenced by the data with permanent complexity, a template, expressed in a program code and stored in a database configuration file, is generated (box 226). Conveniently, the template is represented by a string of characters, divided into segments by characters-separators specifically designated for this purpose.

The variable part 228 of the data is processed in box 230 to determine to which MS-nodes they belong. These nodes are designated as replicable, and the corresponding segments of the template 226 are marked by a specially designated symbol, e.g. an exclamation mark. This concludes generation of the template, and indicates that the database is ready to accept data from the user, thus completing a first phase of the database design. Optionally, the user may or may not initiate a second phase of the database design requesting changes of the storage space structure of the variable type nodes, depending on whether or not the complexity of the data to be stored differs from the anticipated data complexity. For example, if all the inventions to be recorded into the database are made by the anticipated number of inventors (e.g. sole inventor), then the user keeps entering the corresponding data until they are exhausted without worrying about the second phase. However, if actual number of inventors exceeds the anticipated number for a certain invention, the user has an option to request the adaptation of the data storage space architecture to the increased complexity of the data (box 232). Thus, the second phase of the database design starts with determining the MS-node to change (box 234), and creating an additional empty sequence of cells for this particular node (box 236). The updated node is incorporated into the record instead of the old one (box 238), and the updated record is stored into the database instead of the old one (box 240). This process can be repeated as many times as required for bringing the storage space structure into a correspondence with the changed data complexity. After that, the user may continue to enter data into the database (box 242) from a data flow (box 246). When the data storage space architecture of the database is determined, it can be conveniently stored on a computer hard drive, or in computer memory, e.g. RAM depending on the size of the database.

FIGS. 8A and 8C illustrate a storage space structure of two exemplary database records, and FIGS. 8B and 8D show two portions of a program code of the template (formed in step 226 of FIG. 7) corresponding to the storage space structure of the records of FIGS. 8A and 8C respectively. In FIGS. 8B and 8D, a symbol "_" is used for identifying an empty cell, a character-separator ":" is used for identifying node boundaries, and a character-separator "::" is used for identifying cell boundaries. FIG. 8A shows a record 250 including four SC-nodes 251, 252, 253 and 254, and FIG. 8B shows a corresponding portion of the template including three characters-separators ":" for identifying boundaries between nodes 251 and 252, nodes 252 and 253, and 253 and 254 respectively. Similarly, FIG. 8C shows a record 260 including three MC-nodes 261, 262 and 263, each node having two cells, and FIG. 8D shows a corresponding portion of the template including two characters-separators ":" for identifying boundaries between the nodes 261 and 262, and between the nodes 262 and 263, and three characters-separators "::" for identifying boundaries between the cells within each of the nodes.

Figure 9:
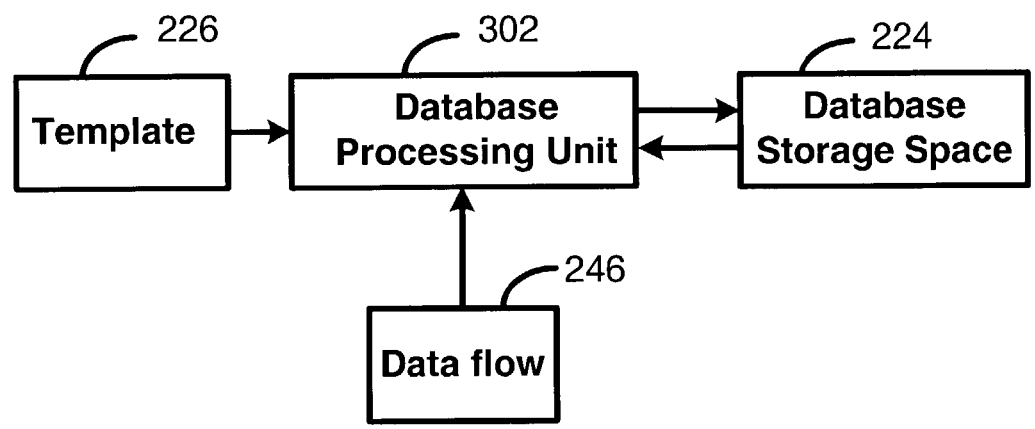
FIG. 9 illustrates a flow of information relating to the data storage space architecture to/from a database processing unit.

Once the required architecture of the database storage space has been determined (step 224 of FIG. 7) and the template 226 is formed (step 226 of FIG. 7), this information is made available to a Database Processing Unit (DPU) 302, the database software that performs database operations, to provide that the incoming data from the data flow 146 are put into the right places in the storage space structure of the nodes of the data storage space architecture of the computer database (FIG. 9).

Figure 10:
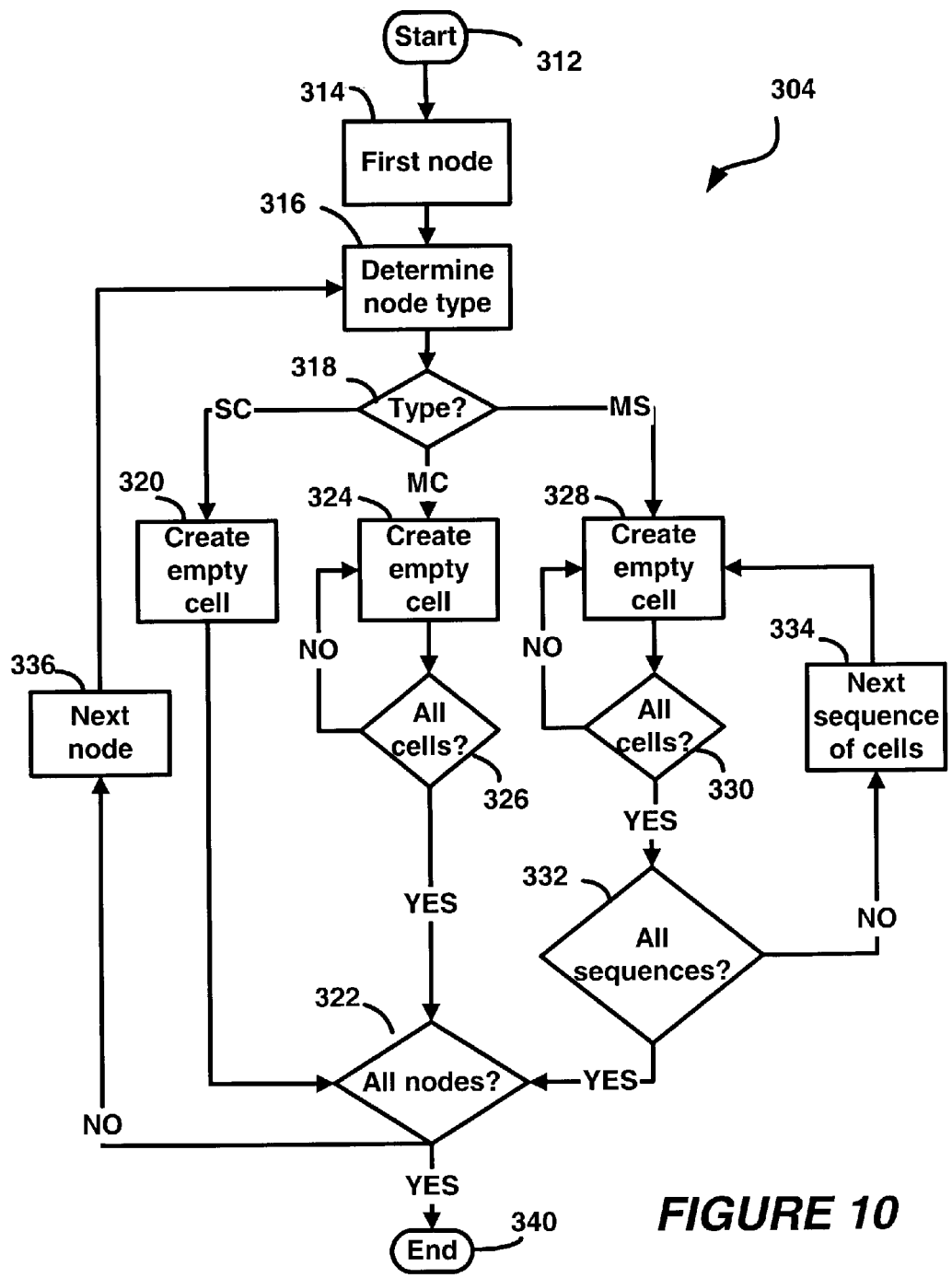
FIG. 10 is a flow-chart illustrating steps performed by the database processing unit to add a record to the database.
Figure 11:
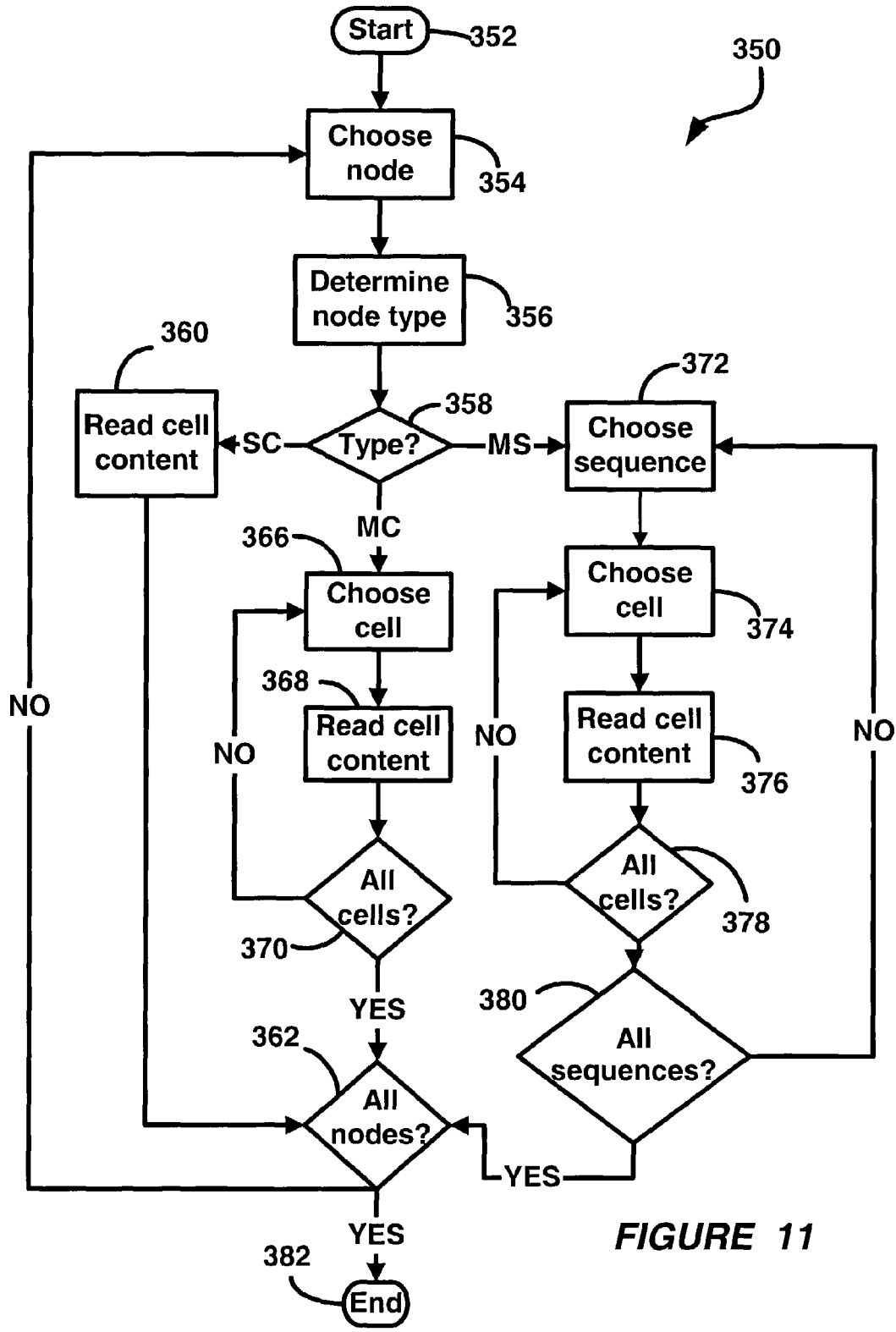
FIG. 11 is a flow-chart illustrating steps performed by the database processing unit to read a record from the database.

The DPU 302 performs a number of database operations, among which adding a record and reading a record are the two basic operations. Steps performed by the DPU 302 to create (add) a record in the database are summarized in a procedure 304 of the flow-chart of FIG. 10. Upon start (box 312), the DPU sets a first node (box 314) and determines its type from the template (box 316). If the node is of SC-node type (exit from box 318 labeled "SC"), then empty cell is created (box 320), and we further proceed to checking whether all required nodes have been created (box 322). If the node is of MC-node type (exit from box 318 labeled "MC"), then additional empty cells required by the template are created (box 324, 326) followed by verification that all required nodes have been created (box 322) If the node is of type MS-node (exit labeled "MS" from box 318), then the DPU 302 creates cells within the current sequence of cells (boxes 328, 330). If all cells are created within the sequence (exit "Yes" from box 330), then the procedure continues with further verification if all sequences of cells have been created (box 332). If the answer is "No" (exit "No" from box 332), the procedure sets to create another sequence of cells (box 334) and returns to repeat the steps 328, 330, 332, 334 until all the required sequences of cells have been created. If the answer is "Yes" (exit "Yes" from box 332), the procedure 304 checks if all nodes have been created (box 322). If the answer is "No", the procedure 304 sets to create another node (box 336), and performs the steps corresponding to the answers "Yes" and "No" from the boxes 314 to 322 as described above. Newly created nodes join the pool of existing nodes, and the process repeats itself until the end of the template is reached. Finally, the newly created record is populated with data and saved in the database. If the answer to the question in box 322 is "Yes", the procedure 304 is terminates (box 340). When reading data from a record in the database, the DPU 302 performs the steps illustrated in a flow-chart 350 of FIG. 11. Upon start (box 352), the DPU 302 picks up a node from the record (box 354) and determines the type of the node from the template (box 356). If the node is of type SC-node (exit "SC" from box 358), then the DPU 302 reads the content of the node (box 360) and chooses another node (exit "No" from box 212), if any. If there are no more nodes to read (exit "Yes" from box 362), the procedure 200 is terminated (box 364). If the node is of type MC-node (exit "MC" from box 358), the DPU chooses a cell from the node required by the template (box 366) and reads the content of the cell (box 368). The loop for selecting cells from the sequence of cells and reading their content (steps 366 and 368) is repeated for each cell from the selected node (exit "No" from box 370) until all the cells have been processed (exit "Yes" from box 370). Next, verification is performed checking if all the nodes have been processed (box 362), followed either by choosing another node (exit "No" from box 362) or terminating the procedure (exit "Yes" from box 362). If the node is of type MS-node (exit "MS" from box 358), the DPU 302 determines the actual number of sequences of cells in the node, chooses a sequence of cells (box 372) and reads the content of each cell in the sequence until all the cells in the sequence are processed (loop including boxes 374, 376 and 378). Each sequence of cells in the node of type MS-node is processed in the same manner until all the sequences of cells forming the node are processed (loop between boxes 372 to 380). This process is repeated on any node as many times as the template warrants it. If all sequences of cells within the node have been processed (exit "Yes" from box 380, and all nodes have also been processed (exit "Yes" from box 362),), the procedure 350 is terminated (box 382) and the record has been read in its entirety.

Adding a new record and reading data from the existing record are two basic operations on which many other useful database operations are built. For example, updating existing record is accomplished as a combination of reading existing record and creating a new, partly modified, record instead of the old one.

Figure 12:
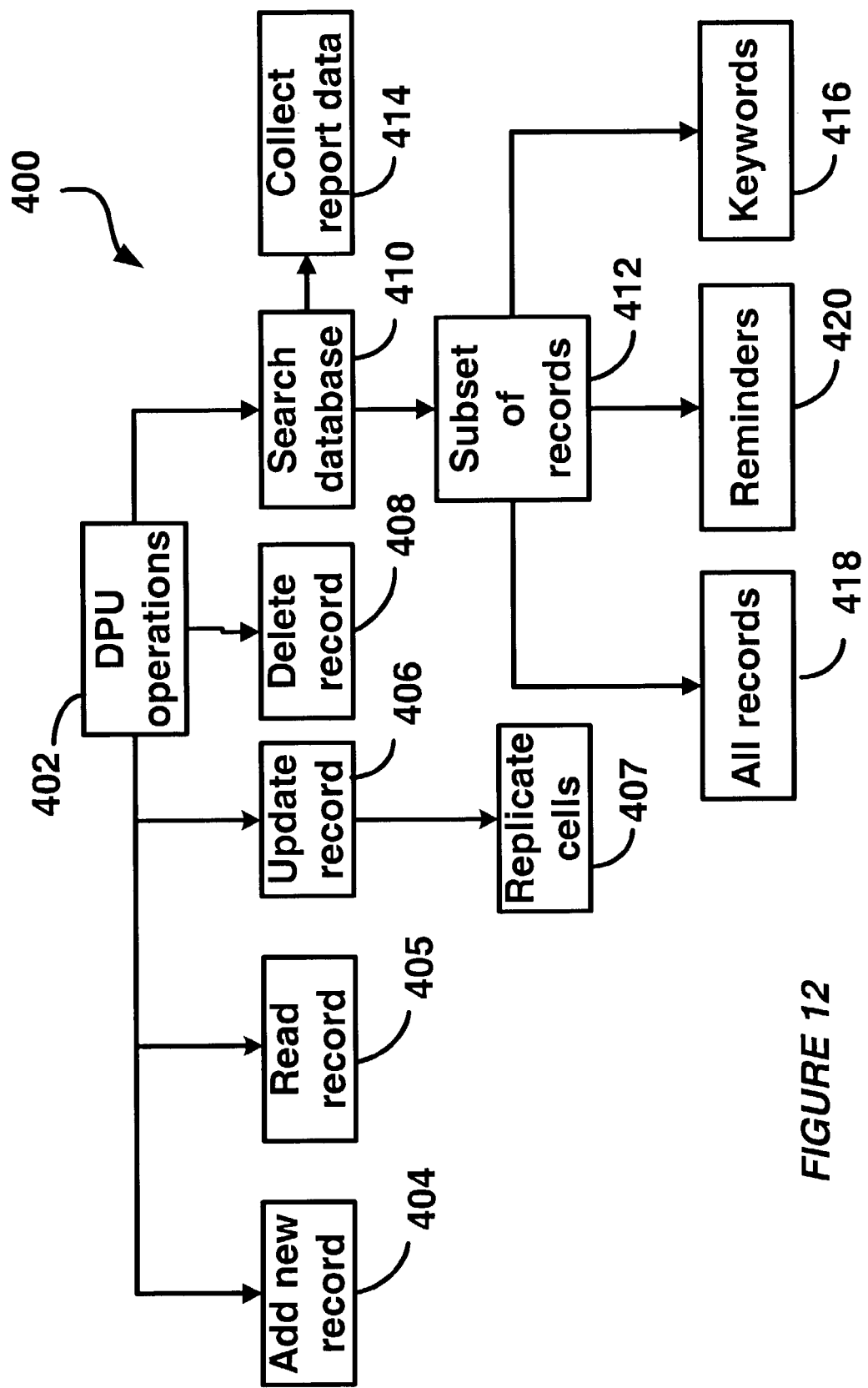
FIG. 12 is a diagram illustrating a list of database operations performed by the database processing unit.

A list of database operations performed by the DPU 302 is illustrated in a diagram 400 of FIG. 12. They include adding a record (box 404), reading a record (box 405), updating a record (box 406) including replicating of sequences of cells in the nodes designated as replicable (box 407), deleting a record (box 408), searching the database (box 410), including finding a subset of records (box 412) and collecting data from selected records (box 414). To find a subset of database records, a user supplies keywords combined into logical expressions by logical operators like "AND", "OR" et al (box 416). To further enhance the database usability and user friendliness, the DPU 302 is designed to be aware of basic standard criteria of defining a subset of records. For example, it is instructed to find all existing records in the database (box 418), which is practical for relatively small databases, or records within certain time limits, or reminders associated with certain records (box 420). As a result, users have a choice of either providing their own keywords or using one of the predefined keywords or logical expressions. The aggregate characteristics of the database are provided in a form of several database reports, which are based on the analysis of data stored in certain cells of database records. In the simplest case, the data in a cell represents a numerical value, for example, amount of money paid on an invoice (let's assume that in the example mentioned above, the database record, in addition to the title and names of the inventors, also includes the invoice information). Getting through all the records and collecting these data would allows to keep track of the distribution of the data values in question over records. We will refer to such a report as the report of type one, or simple report. The cell, to take the data from, is identified in the template by the cell coordinates: Node Number, Sequence Number, and Cell Number. When getting through the records, the underlying storage space architecture has to be taken into account, specifically, whether or not the cell, from which the data are being collected, is a part of a MS-node. If so, the total of data value across all the corresponding cells in the sequences of cells within the node should be calculated and used for determining the distribution of the data values over records. To inform the DPU 302 that the total should be calculated and presented to the user, the corresponding cell is marked in the template by placing a "calculate total" indicator (for example, °—ASCII #186).

In the above invoice example, each sequence of cells within the MS-node corresponds to the invoice, associated with the record, and the total of data values represents the total expenses per record. In many practically important cases data stored in a cell are represented by values, possibly non-numerical, from a predefined set of discreet values. Let's assume that the database record in the above example including the title, names of inventors and the invoice, information, further comprises patent submission status information. For example, the patent submission status may be defined as one of the following: "received", "approved", "outsourced", "filed", "put on hold", and "closed", the list being not exhaustive. The subject of interest would be the list of records containing each value. It is understood that there are as many lists of records as there are discreet values. In the above patent submission example, there is a list of records associated with "filed" submissions, another list of records associated with "approved" submissions etc. We will refer to such a report as the report of type two, or basic report. By generating a simple report for each list of records, a basic report may further be enhanced. We will refer to such a combination of the basic report and the set of simple reports as a combined report, or the report of type three. Combining the invoice and patent submission examples mentioned above, we would get the list of records associated with filed submissions and total spending on each record, the list of records associated with approved submissions and total spending on each record etc. There are many specific variants of the combined reports depending on the choice of cells for generating simple and basic reports. To inform the DPU 302 what kind of reports are required and how many of them, the necessary information about reports is included into the template (configuration file) in the form of the report templates. The simplest report template is provided for type one and type two reports, which means that there are only two pieces of information "Report name" and "Cell coordinates" in the following format "Report name|cell coordinates". Cell coordinates are provided in the form "Node number:Sequence number:cell number". For example, "Simple|2:1:1" defines the report titled "Simple", data should be taken from the first cell in the first sequence of cells of the second MS-node in the record. The report template for the combined report follows a similar format, namely "Report name|First Cell coordinates|Second Cell coordinates", where "First Cell coordinates" determines the cell, from which data has to be taken for the basic report, and "Second Cell coordinates" determines the cell, from which data has to be taken for a set of simple reports. In many databases, records require certain actions, associated with the record, to be taken at some point in time. The date of action to perform is normally stored in a specially designated cell of the record. Usually there are multiple different actions, associated with the record, which have to be performed at different times. Information about the cell, from which the date has to be taken, is contained in the configuration file (template) in the form of the "Cell coordinates", described earlier. When required to do so, the DPU 302 determines from the configuration file where to look for a cell containing the required date, compares the date with the current system date, and decides whether or not to include this record into a list of records to display to a user. If the cell, from which the date is being collected, is a part of a MS-node, the corresponding dates in all sequences of cells have to be compared with the system date. The record is put on the list of records to display, if at least one of the comparisons is positive. The record may also contain a confirmation that the required action has been already taken, and therefore no date comparison is needed. If so, the information about the additional cell should be included in the configuration file in the form of "First Cell coordinates|Second Cell coordinates", where "First Cell coordinates" defines the cell from which the date has to be taken, and "Second Cell coordinates" defines the confirmation cell.

To interact with a user, a graphical user interface (GUI) for the database is provided. The GUI comprises a computer readable program code means for input and output of data to be stored in the storage space of the nodes of the data storage space architecture of the database, including means for displaying information relating to a database record on a computer screen. The GUI for the database of the first embodiment of the invention comprises a plurality of GUI sections for receiving information and instructions relating to the database record, the GUI sections corresponding to the nodes of the storage space architecture, the GUI section, corresponding to the variable type node having the replicable group of cells, having a replicable area within the GUI section, which is able to replicate itself in response to an event. The GUI further comprises means for requesting replication of the replicable area within the GUI section.

Figure 13:
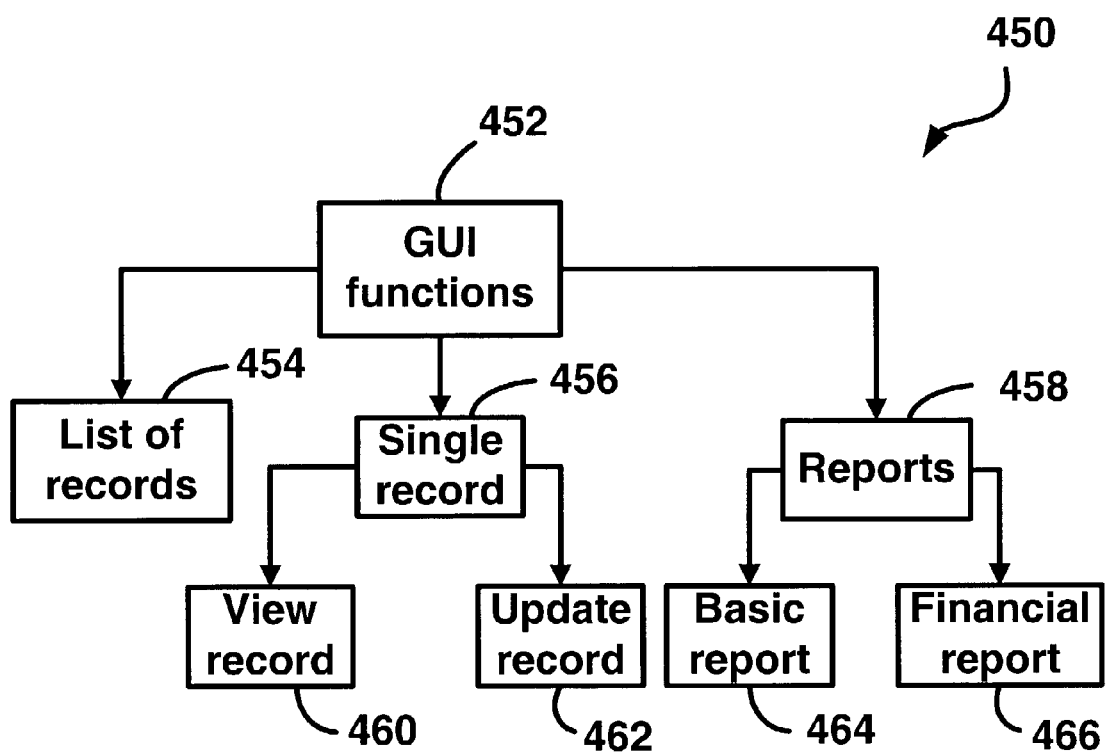
FIG. 13 is a diagram illustrating a list of functions performed by a graphical user interface (GUI) for the computer database of the embodiments of the invention.

A flow-chart 450 illustrating functions of the GUI (box 452) is shown on FIG. 13. These functions can be divided into three groups: displaying all records (box 454), displaying a single record (box 456) and displaying database reports (box 458). The displaying of all records is provided in the following manner: when the DPU 302 comes up with a set of records in response to a user's request, the records are displayed one-by-one on the screen. If there are too many records, only a sub-set of records is displayed at a time including only selected information from each record.

Displaying a single record (box 456) comes in two flavors: for viewing only (box 460), where no change to the record is allowed by a user, and for updating the record (box 462). When the user decides what record to view, the GUI consults the template stored in the configuration file and generates a visual representation of the storage space architecture according to the following rules:

- A SC-node is represented by a table, having one raw and one column;
- A MC-node is represented by a table, having one raw with the number of columns equal to the number of cells within the node;
- A MS-node is represented by a table, having as many rows as there are sequences of cells, and number of columns equal to the number of cells in the sequence; and
- Nodes are displayed vertically one-by-one in a sequential order.

All the data in the record are read and shown on the computer display in full detail according to this arrangement. When updating a record, the GUI unit additionally generates the following elements:

- Means for accepting information from the user; and
- Means for requesting deletion of existing sequences of cells or creation of additional sequences of cells.

For example, if the record is displayed as a HTML document, these can be a simple input box and two clickable buttons or images, one the deleting a sequence of cells, and another one for adding a sequence of cells. When the user decides to change the number of sequences, one of these buttons is clicked upon. The GUI directs this request to the DPU 302 for acting upon it, and in response receives an updated version of the visual representation of the storage space. After the user has provided all the information, the GUI sends it to the DPU 302 to update the corresponding record in the database.

Displaying of the database reports can be accomplished in as many ways as there are different kinds of reports. In the first embodiment, the display of the basic report 464 and financial report 466 is provided. Reports of type two are displayed in two stages. At the first stage, a table with two rows is displayed, the first row containing a pre-defined set of discreet values as described earlier. In the second row the total number of records in the list of records associated with each value is displayed. Each number serves simultaneously as a link, which, when clicked upon, triggers display of the corresponding list of records. Reports of type three are displayed in a similar manner, but the table contains an additional row. Each cell of this third row contains the total over all records in the simple report, associated with the cell.

Let us consider a real life example, deliberately simplified for illustrative purposes.

Example 1

An enterprise creates a database of inventions made by its employees. The information to be stored in the database is as follows:
1. Reference number of the file assigned for internal purposes;
2. Reference number of the file assigned for external purposes;
3. Title of the invention;
4. Last, first and middle names of the inventor;
5. Citizenship of the inventor;
6. Address of the inventor;
7. Patent award paid to the inventor; and
8. The date when the award was paid.

Currently, there is only one invention made by two employees, to enter in the database:
Title: Optical device
Internal reference number: 1234
External reference number: 5432
Name address and citizenship of the 1st inventor: Smith, John Walter; 5 Nadia Lane, Kanata, Ontario K2M 4G9 Canada; Canadian;
Award: $1,000 received on Mar. 10, 2002.
Name, address and citizenship of the 2nd inventor: Collier, Allan Craig; 6 Flower Road, Nepean, Ontario N2P 7H9 Canada; Canadian;
Award $1,000 received on Mar. 12, 2002.

A second invention might follow soon, but no data is available yet, except that three employees will be names as inventors.

Analysis of this information reveals that first and second items represent a first data building block that has a complex structure and may be called "File No.". It is composed of two components "Internal Number" and "External Number" forming one logical unit of information. The third item represents simple data block "Title". The fourth to eighth items may be selected to represent a second data building block called "Inventor", which composed of seven components: "Last Name", "First Name", "Middle Name", "Citizenship", "Address", "Award" and "Date". There can be only one title and reference number, but the number of inventors may vary. Thus, "Title" and "File No." belong to the permanent part of data and will be stored in the permanent type nodes, and "Inventor" belongs to the variable part of the data and will be stored in the variable type node.

Figure 14:
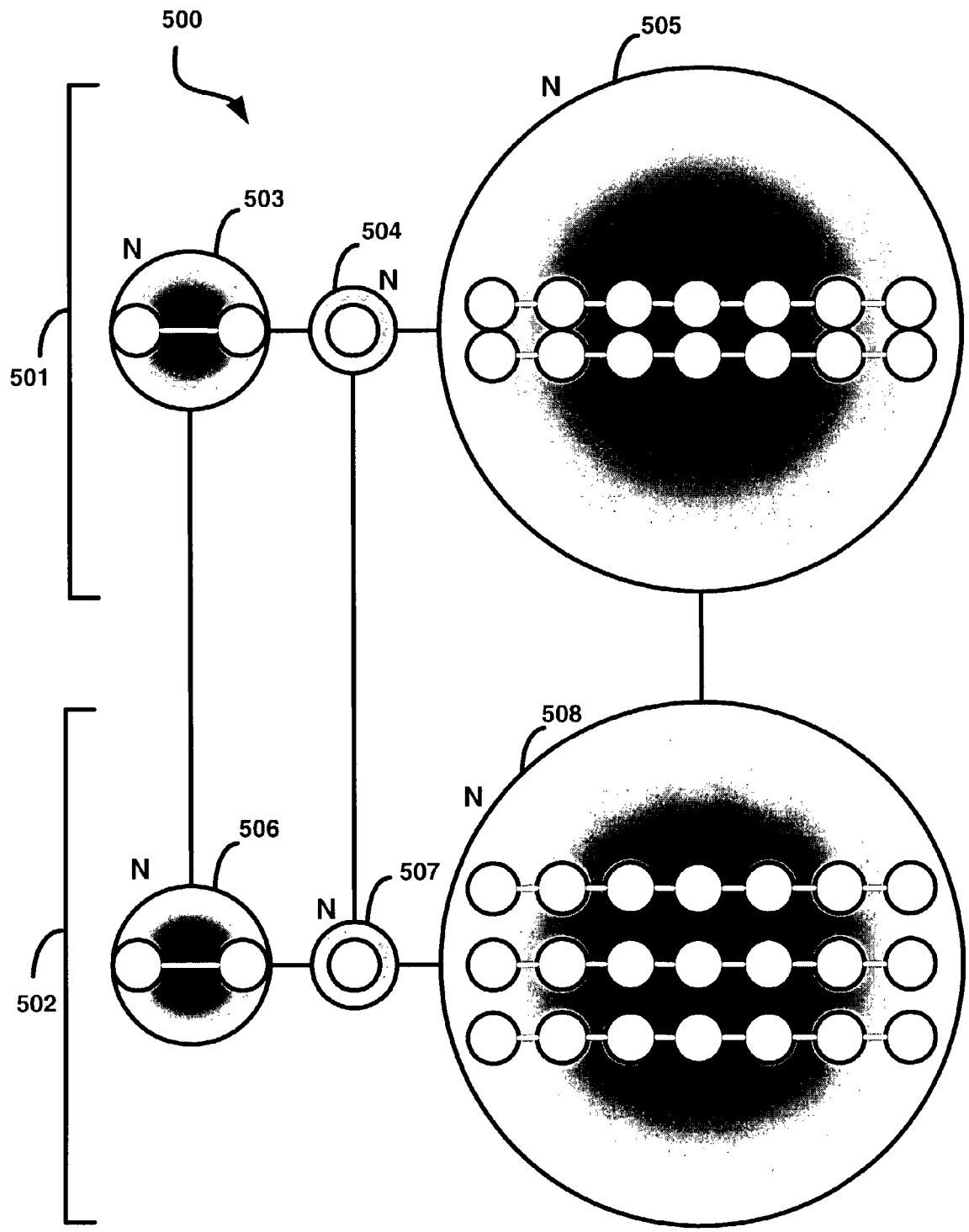
FIG. 14 shows a data storage space architecture for the computer database of the first embodiment for storing patent related information.

FIG. 14 shows a data storage space architecture 500 corresponding to the data described above. It includes two database records corresponding to the two inventions, the first record 501 and a second record 502, each record including three nodes corresponding to three logical units of the above information. The first record 501 includes a MC-node 503 having two cells for storing internal and external file numbers respectively, followed by a SC-node 504 having only one cell for the title, followed by a variable type MS-node 505 having two sequences of cells (for two inventors), each sequence containing seven cells for the inventor related information mentioned above. The second record 502 includes a MC-node 506 (whose structure is similar to the structure of node 503 of the first record), a SC-node 507 (whose structure is similar to node 504), and a MS-node 508 including now three sequences of cells for storing information related to the three inventors.

Nodes 503 to 505 represent the database record ready to be populated with the currently available data. Nodes 506 to 508 represent the record to be populated as soon as the data about the second invention becomes available. If the actual number of inventors turns out to be different, the number of sequences of cells can be corrected, since the nodes 505 and 508 are designated as variable type nodes.

Figure 15A:
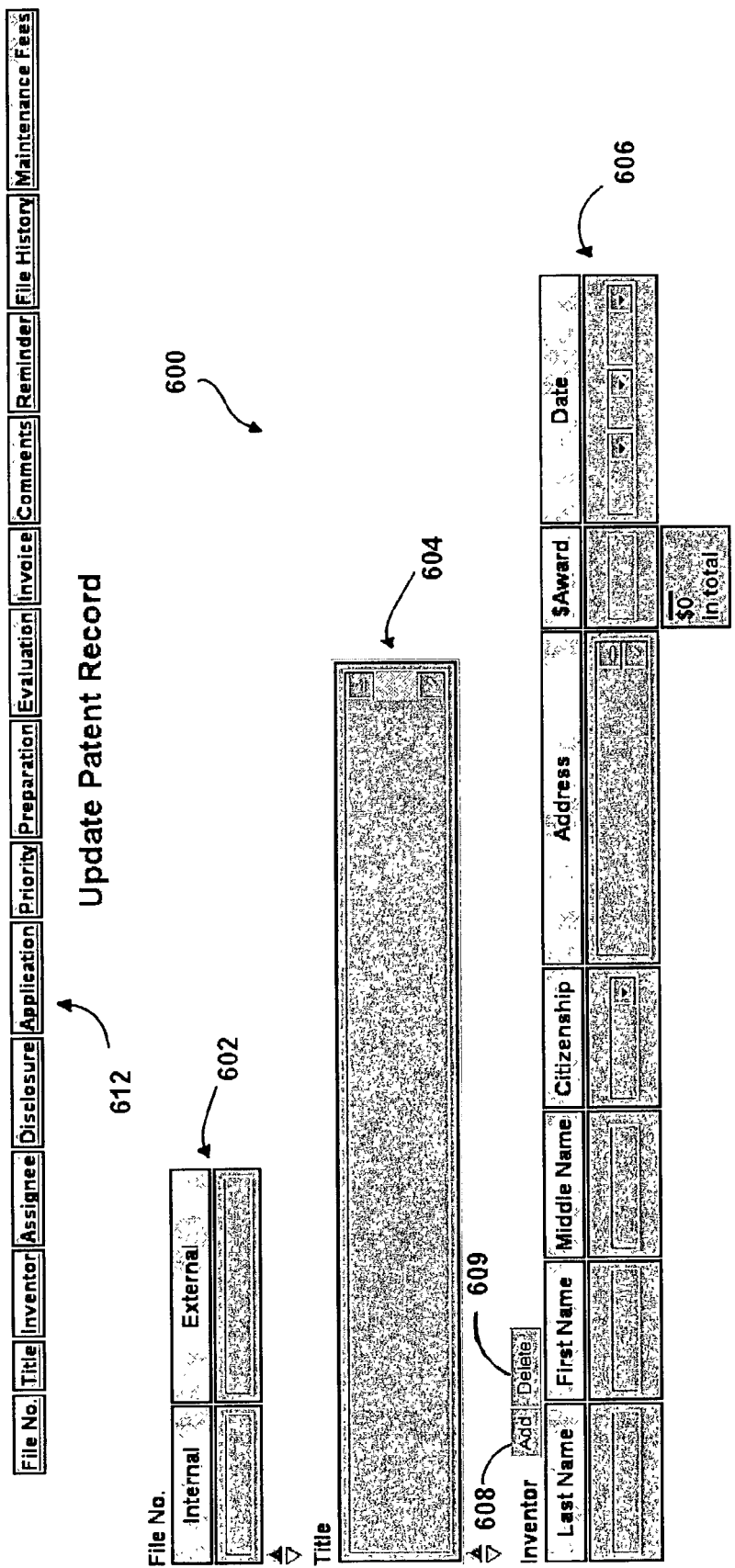
FIGS. 15A to 15D show a graphical displaying of the database record of FIG. 14.
Figure 15B:
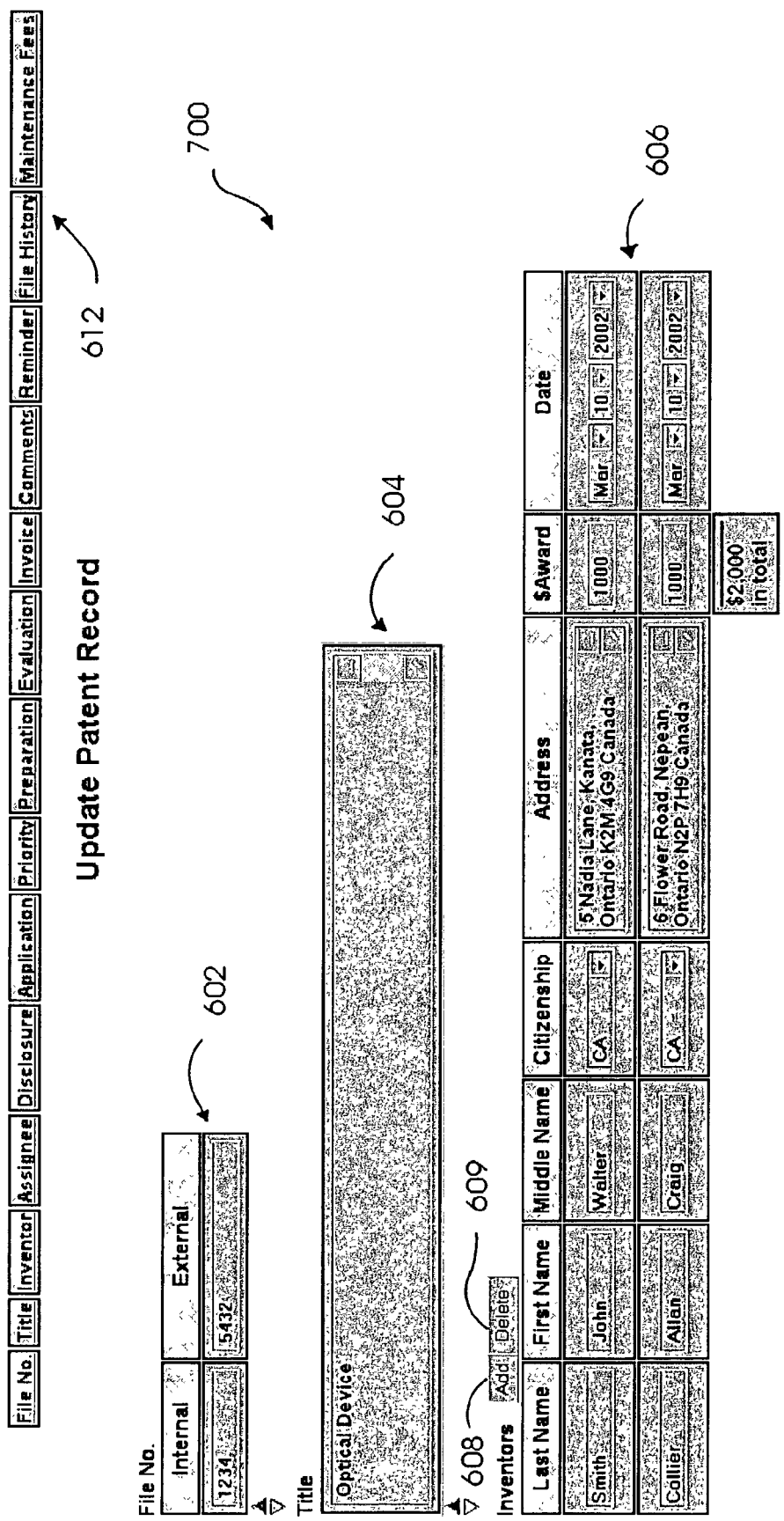

A graphical displaying of the information related to the database records described above produced by the GUI is shown in FIG. 15A to 15E. FIG. 15A shows a graphical template 600 for entering information and instruction related to the database record having the data storage space architecture of FIG. 14. It includes three GUI sections (File No 602, Title 604 and Inventor 606) corresponding to the nodes 503, 504 and 505 of the first record 501 of FIG. 14 respectively, (or similarly, to the nodes 506, 507 and 508 of the second record 502 of FIG. 14 respectively), depending upon what record is going to be populated. The graphical displaying 700 of the first database record, populated with the title, reference number and information related to the two inventors, is shown in FIG. 15B. To request the addition of the third inventor to the record, the GUI section "Inventor" has a clickable button "Add" 608 associated with this GUI section for generating a request to replicate the Inventor section on the computer screen and to provide corresponding changes in the variable part of the storage space architecture. The GUI section "Inventor" also has another clickable button "Delete" 609 for generating a request to delete a sequence of cells related to one of the inventors including its graphical representation on the screen.

Figure 15C:
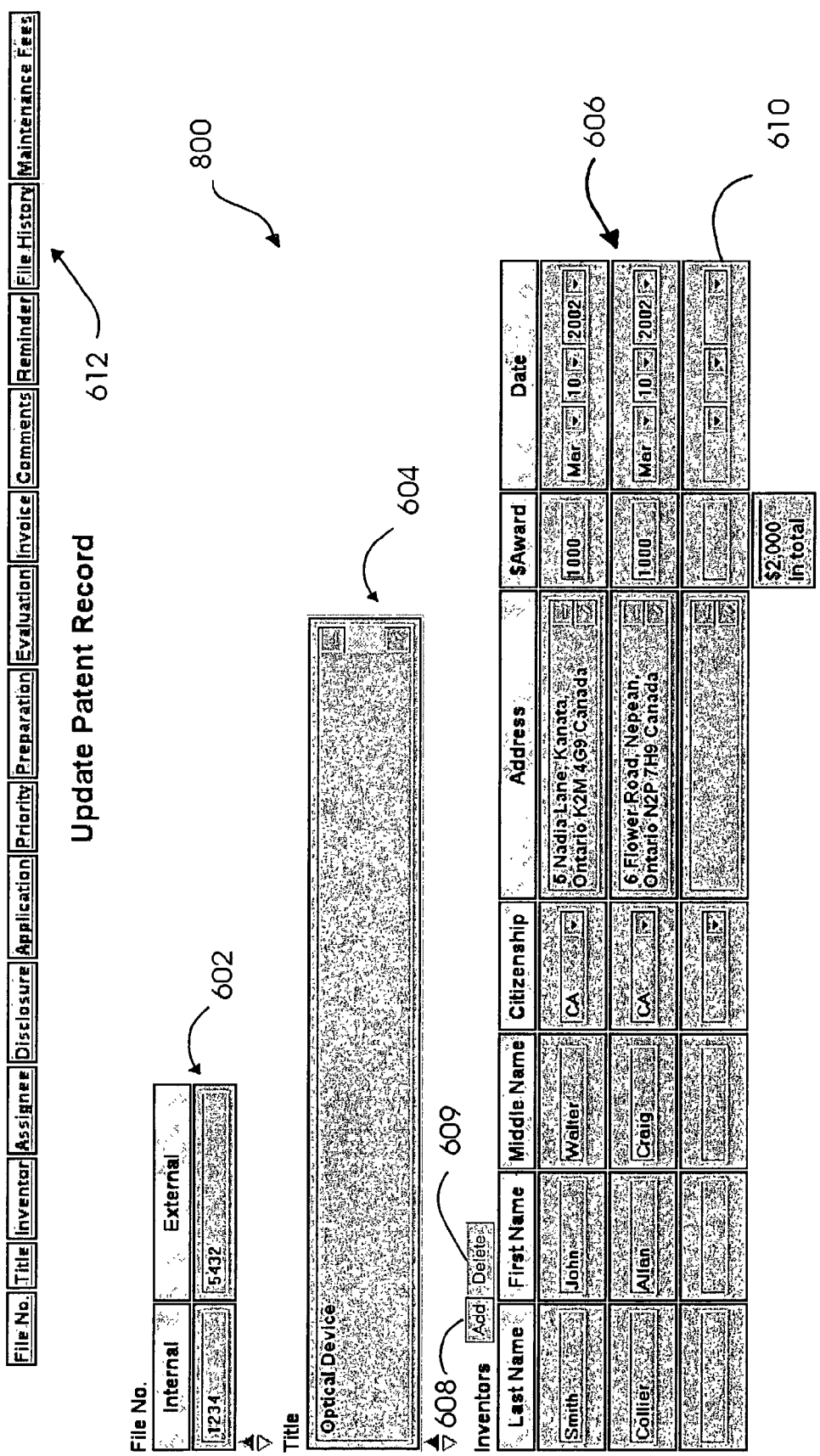
Figure 15D:
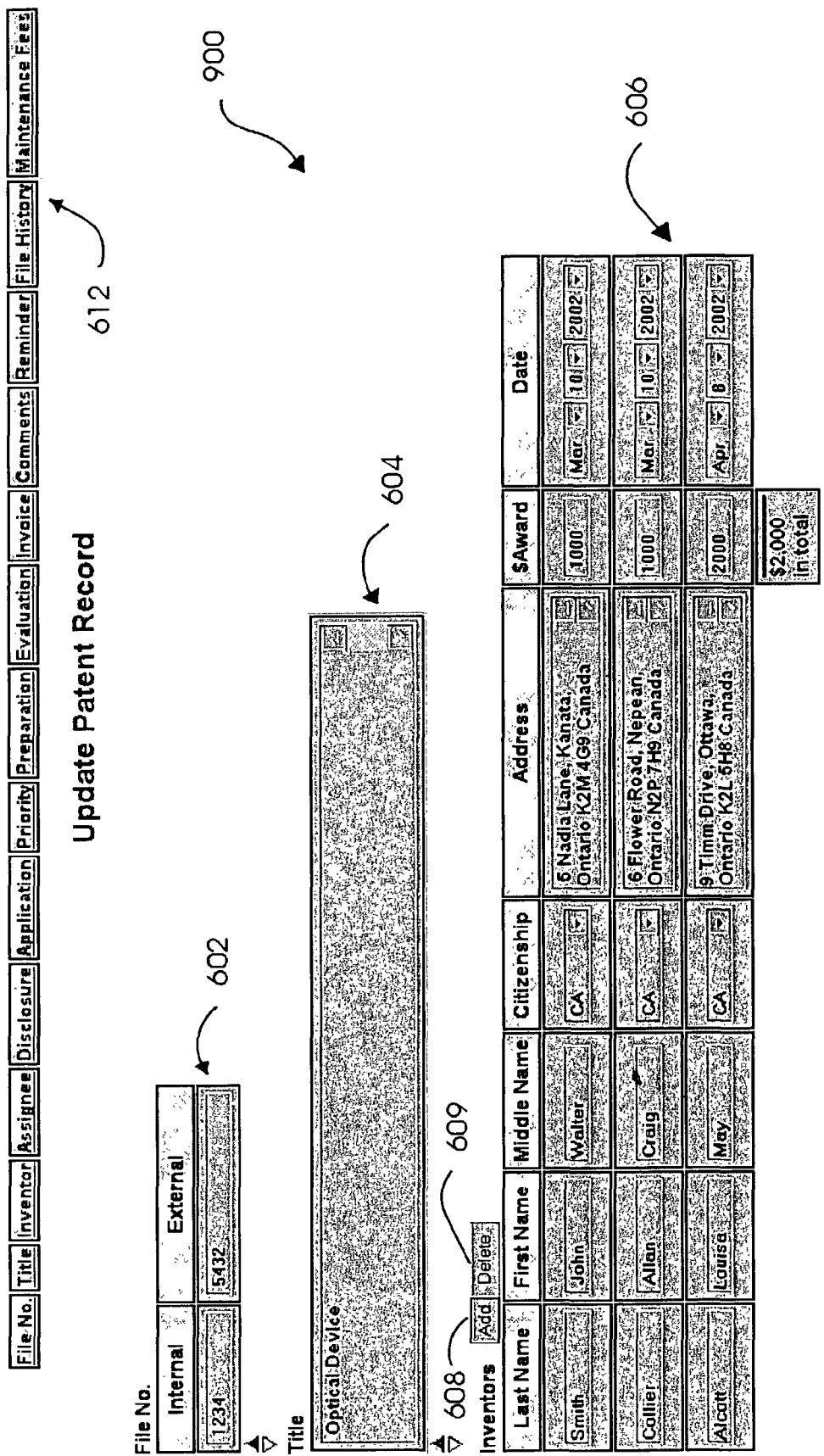

A corresponding graphical display of the first database record on the computer screen after submitting and processing the request to add the third inventor is illustrated in FIG. 15C, showing a third empty line 609 for entering information related to the third inventor. When the data related to the third inventor has been entered in the database, the record appears on the screen in the form shown in FIG. 15D. Graphical displaying of the second record 502 including nodes 506 to 508 is similar to that of FIGS. 15A to 15D and not shown.

In the example of the patent record shown above, only certain portions of the record including patent related information have been illustrated. Additional portions of the patent related record may include other areas, e.g. area for assignee information, area for patent application information, area for corresponding prior filed application, area for outsourcing and responsible attorney information, area for patent evaluation information, area for financial information (e.g. invoices), area for reminders associated with the record (either internal or resulting from the patent statute rules), area for maintenance fees, and area for recording correspondence with a Patent Office, the list being not exhaustive. Conveniently, the list of GUI sections corresponding to the nodes of the storage space architecture is summarized in the Bar 612 at the top of the record, each section of the Bar providing a link to the corresponding GUI section.

Thus, a database including adaptive storage space architecture, database processing unit and graphical user interface, which provides adaptive storage of complex data is provided.

Numerous modifications may be made to the embodiment described above. While nodes used in the first embodiment have cells arranged in a row, it is understood that cells in the node may also be arranged in a column or any other group of cells to be used as a building block for the database record. Nodes can be of much more complicated structure, if warranted by the data to be stored. For example, we may define a super-node including a combination of SC-nodes, MC-nodes and MS-nodes.

The database having the storage space architecture described above may be used on a stand-alone computer, or in a network environment, e.g. in a local area network (LAN), corporate Intranet environment or the Internet environment.

Conveniently, the replicable areas in the GUI sections may be also chosen to be made collapsible, i.e. hiding and displaying the information of the corresponding GUI section on user's request. This feature may be especially useful when the replicable area becomes relatively large (e.g. there are too many inventors), and it is desirable to display only limited portion of it on the screen (e.g. information related to the 1st inventor only), while reserving an option to provide a full display of the whole area, if needed.

The principles, upon which the database of the first embodiment of the invention is designed, allow for creation of a computer database system, including multiple databases that share common facilities, like GUI, DPU etc. We will refer to such a group of databases as Multiple Database System (MDS). Adding a new database to the set of existing databases in the MDS is as easy as creating an additional data storage space architecture, describing a new database.

Figure 16:
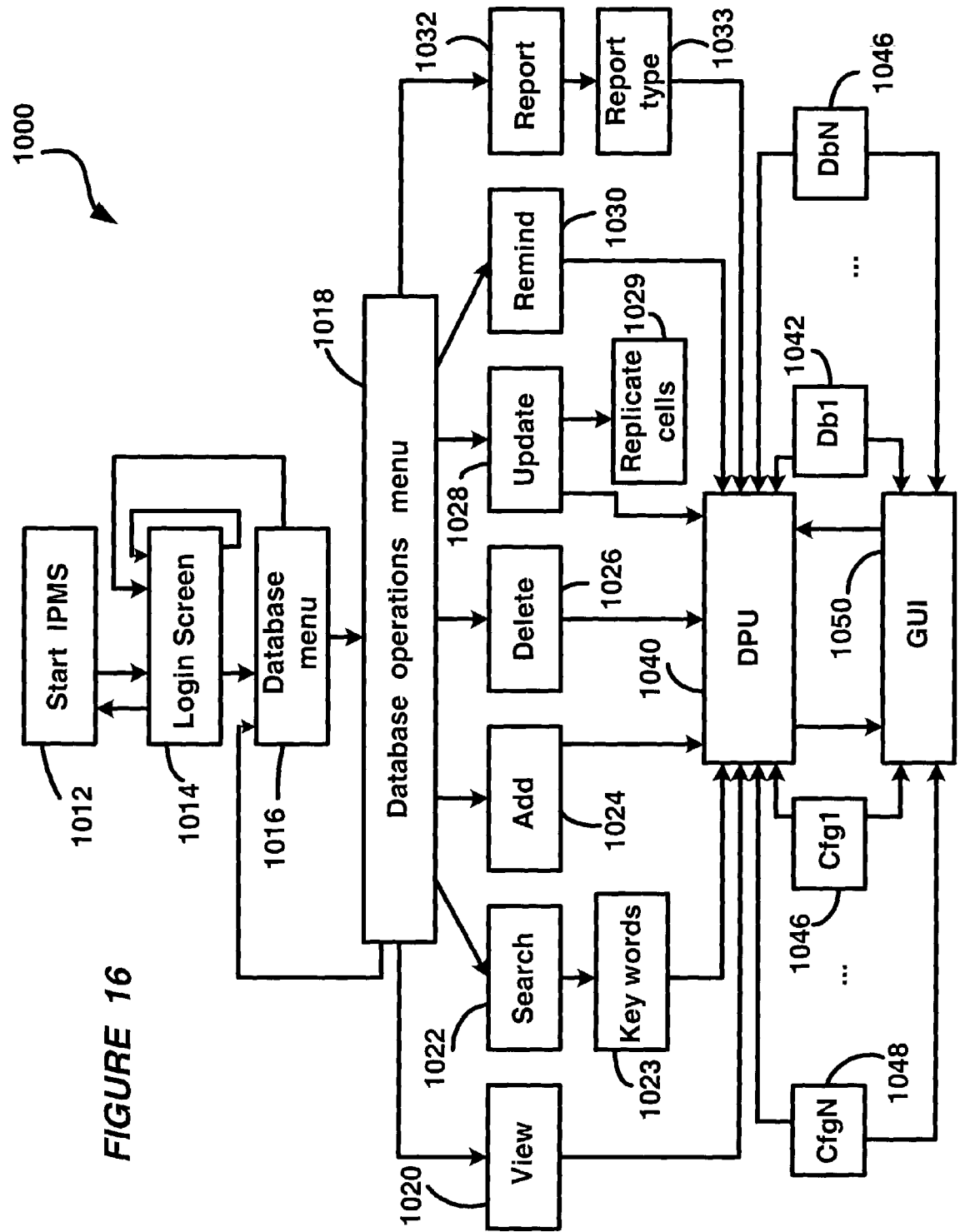
FIG. 16 illustrates a structure of the computer database system according to a second embodiment including two or more databases of the first embodiment of the invention.

A structure of the MDS 1000 according to a second embodiment of the invention is shown on FIG. 16. Upon start (box 1012), the MDS 1000 provides authentication of a user by requesting his/her Login Name and Password (box 1014). If the information provided by the user cannot be found in the database, the MDS 1000 gives the user a chance to correct possible errors before rejecting his/her request for the database access (loop 1013). If the user has been authenticated positively, the MDS determines the level of access, granted to the user by the MDS administrator (loop 1015), and associated with it database menu (box 1016). Normally, the database menu is a subset of available databases, determined by the administrator on the "need to know" basis. For example, an inventor can be granted access to the patent database, but not to Non-disclosure Agreements database, or Contracts database. If the user has the privileges of the MDS administrator, the database menu may include all the available databases. After the user decided on which database he/she wants to work with, the MDS determines the Database Operations menu (box 1018), associated with the database and the user's level of access. Normally, the database operations menu is a sub-set of available database operations, determined by the administrator on the "need to perform" basis. For example, a person responsible for data entry into the database may be granted the right to perform all the available database operations, whereas an inventor is allowed only to Search and View operations. Database operations View 1020, Search 1022 including keywords 1023, Add 1024, Delete 1026, Update 1028 including Replicate cell 1029, Remind 1030 and Report 1032 including Report type 1033, which are similar to that ones discussed above, are shown in FIG. 16. After the user decides on the database operation to perform, the DPU 1040 determines which database out of a plurality of databases Db1 1042 to DbN 1044 to select and correspondingly, which configuration file out of corresponding plurality of configuration files Cfg1 1046 to CfgN 1048 to consult and act upon, which stores the required database storage space architecture and other relevant information. The results are submitted to the GUI unit 1050 for displaying to the user. The GUI unit 1050 is identical to the one for a single database described earlier, with the exception of an additional step of determining which database architecture file (which Cfg"i" file, i=1, . . . N) to consult and act upon. The user has an option to return to the Database Operations menu 1018 to choose another database operation to perform, or to return to the Database Menu 1016 to choose another database to work with, if any, or to log out from the system 1014.

Conveniently, the MDS 1000 of the second embodiment of the invention includes the databases related to one or more of the following: patents, trademarks, nondisclosure agreements, contracts, including licensing contracts, domain names, restricted distribution of documents, human resources, inventory, and finance. Each of the databases has its own set of permanent and variable nodes, replicable areas in the GUI sections corresponding to the variable nodes. For example, the record including trademark related information comprises one or more of the following variable nodes and corresponding replicable areas in the GUI: area for assignee information, area for trademark application information, area for corresponding prior filed application, area for outsourcing and responsible attorney information, area for financial information, area for reminders associated with the record, area for maintenance fees, and area for recording correspondence with a Trademark Office.

Alternatively, the record including contract related information may comprise one or more of the following variable nodes and corresponding replicable areas in the GUI: area for effective and expiry dates of the contract, area for business and technical contact information, area for financial information, area for reminders associated with the contract, and area for recording correspondence related to the contract. It is contemplated that various other nodes within records of different databases and corresponding replicable areas in the GUI sections may be designed as required.

The MDS 1000 of the second embodiment has the following advantages. Each newly added database is independent from other databases in the MDS and can be configured to be highly specialized, i.e. to be best suited for storing data covering a specific subject matter. For example, the database can be specialized to store patent related data, whereas already existing database has been specialized to store trademark related data. One of the advantages of such MDS is the possibility of covering a vast subject area without compromising the performance of any individual database in the set. Another advantage of such MDS is the possibility of its incremental development by adding a new database, when needed, without effecting already existing databases in any way. When the need arises to modify or redesign one of the existing databases, all other databases will continue to work as usual, except for that being modified. There is no need to overhaul the whole MDS just because of the changes to one of the existing databases.

Thus, a computer system of databases is provided, which includes a plurality of databases described above, possesses all advantages of a single database and allows a great flexibility in creating a customized set of databases sharing same data processing unit and graphical user interface, while storing data and operating substantially autonomously.

Although specific embodiments of the invention have been described in detail, it will be apparent to one skilled in the art that variations and modifications to the embodiments may be made within the scope of the following claims.

What is claimed is:

1. A computer database comprising computer readable instructions, for execution by a processor, stored in a non-transitory computer readable storage medium, forming:
    a data storage space architecture of the database, comprising:
    a grid having grid lines;
    nodes formed at intersections of the grid lines;
    each node having a storage space structure comprising one or more cells;
    at least one node being a variable type node whose storage space structure is adaptable to change in response to an event by changing a number of the one or more cells in the variable type node.

2. The computer database as described in claim 1, wherein the grid is a two-dimensional grid.

3. The computer database as described in claim 1, wherein the event is an external signal.

4. The computer database as described in claim 2, wherein the storage space structure of the variable type node is responsive to the event by replicating at least one of the one or more cells.

5. The computer database as described in claim 4, wherein the storage space structure of the variable type node is responsive to the event in real-time.

6. The computer database as described in claim 4, wherein the storage space architecture of the database is stored in one of the following media:
    non-volatile computer readable storage medium; or
    volatile computer readable storage medium.

7. The computer database as described in claim 4, wherein the at least one of the one or more cells comprises one of the following:
    a single cell (Single-cell (SC) node);
    a sequence of cells (Multi-cell (MC) node); and
    a sequence of sequences of cells (Multi-sequence (MS) node).

8. The computer database as described in claim 4, wherein the storage space structure of the variable type node is responsive to the event by replicating a single cell.

9. The computer database as described in claim 4, wherein the storage space structure of the variable type node is responsive to the event by replicating a sequence of cells.

10. The computer database as described in claim 4, wherein the storage space structure of the variable type node is responsive to the event by replicating a sequence of sequences of cells.

11. The computer database as described in claim 2, wherein the two-dimensional grid has a first plurality of grid lines arranged substantially along one direction, and a second plurality of grid lines arranged substantially along another direction and intersecting the first plurality of lines, a database record being defined as one of the following:
    nodes arranged along one of the grid lines from the first plurality of lines; or
    nodes arranged along one of the grid lines from the second plurality of lines.

12. The computer database as described in claim 4, wherein the grid has a first plurality of grid lines arranged substantially along one direction, and a second plurality of grid lines arranged substantially along another direction and intersecting the first plurality of lines, a database record being defined as one of the following:
    nodes arranged along one of the grid lines from the first plurality of lines; or
    nodes arranged along one of the grid lines from the second plurality of lines.

13. The computer database of claim 1, wherein the computer readable instructions are further configured to form a database processing unit for performing database operations with data stored in the storage space structure of the nodes.

14. The computer database of claim 13, wherein the computer readable instructions are further configured to perform one or more database operations, comprising:
    storing the data in the storage space structure;
    retrieving the data from the storage space structure; and
    processing the data retrieved from the storage space structure.

15. The computer database of claim 12, wherein the computer readable instructions are further configured to form a database processing unit for performing one or more of the following database operations with data stored in the storage space structure of the nodes, comprising:
adding a database record;
deleting a database record;
updating a database record; and
searching through database records;
generating a report by gathering information from database records; and
generating a reminder associated with data stored in a database record.

16. The computer database as described in claim 14, wherein the computer readable instructions are further configured to maintain information about the storage space structure of the nodes.

17. The computer database as described in claim 4, wherein the computer readable instructions are further configured to form a database processing unit for performing database operations with data stored in the storage space structure of the nodes.

18. The computer database as described in claim 1, wherein the data storage space architecture is designed for storing data related to one or more of the following:
intellectual property, comprising:
patents;
trademarks;
non-disclosure agreements;
contracts;
domain names;
restricted distribution of documents;
human resources;
inventory; and
finance.

19. The computer database as described in claim 1, wherein the computer readable instructions are further configured to form a graphical user interface unit for inputting data for storing in the storage space structure of the nodes, and for outputting data stored in the storage space structure of the nodes.

20. The computer database as described in claim 19, wherein the computer readable instructions are further configured to display the data storage space structure of the nodes on a computer screen.

21. The computer database as described in claim 12, wherein the computer readable instructions are further configured to form:
a database processing unit for performing database operations with data stored in the storage space structure of the nodes; and
graphical user interface unit for displaying the database record on a computer screen.

22. A computer database system, comprising two or more computer databases as described in claim 1.

23. The computer database system as described in claim 22, wherein the computer readable instructions are further configured to form:
a database processing unit for performing database operations with data stored in the storage space structure of the nodes of the computer databases; and
a graphical user interface unit for inputting data for storing in the storage space structure of the nodes, and for outputting data stored in the storage space structure of the nodes, comprising displaying the storage space structure of the nodes on a computer screen.

24. A method of forming a computer database, comprising: in a computer having a processor and computer readable instructions, for execution by the processor, stored in a non-transitory computer readable storage medium, configured to perform the following:
forming a data storage space architecture comprising:
forming a grid having grid lines; forming nodes at intersections of the grid lines, each node having a storage space structure comprising one or more cells;
designating at least one node as a variable type node whose storage space structure is adaptable to change in response to an event by changing a number of the one or more cells in the variable type node.

25. The method as described in claim 24, further comprising changing the storage space structure of the variable type node in response to the event.

26. The method as described in claim 24, wherein the step of forming the grid comprises forming a two-dimensional grid.

27. The method as described in claim 25, wherein the step of changing comprises changing the storage space structure of the variable type node in response to an external signal.

28. The method as described in claim 24, further comprising replicating at least one of the one or more cells in the variable type node in response to the event.

29. The method as described in claim 26, wherein the step of forming the two-dimensional grid comprises forming a first plurality of lines arranged substantially along one direction, and a second plurality of lines arranged substantially along another direction and intersecting the first plurality of lines; and
step of forming the data storage space architecture further comprises forming a database record comprising one of the following:
nodes arranged along one of the lines from the first plurality of lines; or
nodes arranged along one of the lines from the second plurality of lines.

30. The computer database of claim 1, wherein the computer readable instructions are further configured to form a graphical user interface (GUI) for inputting data for storing in the storage space structure of the nodes and for outputting data stored in the storage space structure of the nodes.

31. The computer database as described in claim 30, wherein the computer readable instructions are further configured to display the storage space structure of the nodes on a computer screen.

32. The computer database as described in claim 31, wherein the computer readable instructions are further configured to display a plurality of GUI sections on the computer screen, each GUI section corresponding to a respective node of the data storage space architecture.

33. The computer database as described in claim 30, wherein the computer readable instructions are further configured to form a GUI section, corresponding to a variable type node, the GUI section having a replicable area, which is replicated in response to the event.

34. The computer database as described in claim 33, wherein the computer readable instructions are further configured to request replication of the replicable area.

35. The computer database as described in claim 12, wherein the computer readable instructions are further configured to form a graphical user interface (GUI), having a GUI section corresponding to the variable type node, the GUI section having a replicable area for displaying the at least one group of cells and a replica thereof.

36. The computer database as described in claim 35, wherein the computer readable instructions are further configured to request replication of the replicable area.

37. The computer database as described in claim 1 for use on a stand-alone computer.

38. The computer database as described in claim 1 for use in a network environment, comprising one or more of the following:
   local area network (LAN);
   corporate Intranet environment;
   the Internet environment.

39. A computer system, comprising:
   a processor; and
   a memory device storing computer readable instructions, for execution by the processor, causing the processor to form a database having a database storage space architecture comprising a grid having grid lines, nodes formed at intersections of the grid lines, each node having a storage space structure comprising one or more cells, at least one node being a variable type node whose storage space structure is adaptable to change in response to an event by changing a number of the one or more cells in the variable type node.

40. An apparatus for generating a database, comprising:
   a processor; and
   a computer memory storing computer readable instructions, for execution by the processor, configured to generate a database having a database storage space architecture comprising a grid having grid lines, nodes formed at intersections of the grid lines, each node having a storage space structure comprising one or more cells, at least one node being a variable type node whose storage space structure is adaptable to change in response to an event by changing a number of the one or more cells in the variable type node.

41. The computer database as described in claim 15, wherein the computer readable instructions for updating the database record comprise computer readable instructions for replicating the at least one group of cells within the variable type node.

42. An article of manufacture, comprising the computer database as described in claim 1 stored in the non-transitory computer readable storage medium.

43. The method as described in claim 28, wherein the replicating comprises replicating one of the following:
   a single cell (Single-cell (SC) node);
   a sequence of cells (Multi-cell (MC) node); and
   a sequence of sequences of cells (Multi-sequence (MS) node).

44. The method as described in claim 28, wherein the replicating comprises replicating a single cell.

45. The method as described in claim 28, wherein the replicating comprises replicating a sequence of cells.

46. The computer database as described in claim 33, wherein the event is an external signal.

47. The computer database as described in claim 46, wherein the computer readable instructions are further configured to generate the external signal to cause replication of the replicable area within the GUI section.

48. The computer database as described in claim 47, wherein the computer readable instructions are further configured to cause the replication of the replicable area in real-time.

49. The computer database as described in claim 33, wherein computer readable instructions are further configured to form the replicable area, which is collapsible.

50. The computer database as described in claim 30, wherein the computer readable instructions are further configured to form a database record comprising patent related information.

51. The computer database as described in claim 30, wherein the computer readable instructions are further configured to form a GUI section, corresponding to the variable type node, the GUI section having a replicable area, which is replicated in response to the event, the database comprising one or more of the following replicable areas:
   area for inventorship information;
   area for assignee information;
   area for patent application information;
   area for corresponding prior filed applications;
   area for outsourcing and responsible attorney information;
   area for patent evaluation information;
   area for financial information;
   area for reminders associated with the record; and
   area for recording a file history of the correspondence with a patent office.

52. The computer database as described in claim 30, wherein the computer readable instructions are further configured to form a database record comprising trademark related information.

53. The computer database as described in claim 30, wherein the computer readable instructions are further configured to form a GUI section, corresponding to the variable type node, the GUI section having a replicable area, which is replicated in response to the event, the database comprising one or more of the following replicable areas:
   area for assignee information;
   area for trademark application information;
   area for corresponding prior filed applications;
   area for outsourcing and responsible attorney information;
   area for financial information;
   area for reminders associated with the record; and
   area for recording a file history of the correspondence with a trademark office.

54. The computer database as described in claim 30, wherein the computer readable instructions are further configured to form a database record comprising contract related information.

55. The computer database as described in claim 54, wherein the computer readable instructions are further configured to form a GUI section, corresponding to the variable type node, the GUI section having a replicable area, which is replicated in response to the event, the database comprising one or more of the following replicable areas:
   area for effective and expiry dates of a contract;
   area for business and technical contact information;
   area for financial information;
   area for reminders associated with the contract; and
   area for recording a history of actions related to the contract.

56. The computer system of claim 39, wherein the storage space structure of the variable type node is responsive to the event by replicating at least one of the one or more cells.

57. The computer system of claim 56, wherein the at least one of the one or more cells comprises one of the following:
   a single cell (Single-cell (SC) node);
   a sequence of cells (Multi-cell (MC) node); and
   a sequence of sequences of cells (Multi-sequence (MS) node).

58. The computer system of claim 56, wherein the storage space structure of the variable type node is responsive to the event by replicating a single cell.

59. The computer system of claim 56, wherein the storage space structure of the variable type node is responsive to the event by replicating a sequence of cells.

60. The computer system of claim 56, wherein the storage space structure of the variable type node is responsive to the event by replicating a sequence of sequences of cells.

61. The computer system of claim 39, wherein the gird is a two-dimensional grid having a first plurality of grid lines arranged substantially along one direction, and a second plurality of grid lines arranged substantially along another direction and intersecting the first plurality of lines, a database record being defined as one of the following:
  nodes arranged along one of the grid lines from the first plurality of lines; and
  nodes arranged along one of the grid lines from the second plurality of lines.

62. The computer system of claim 39, wherein the computer readable instructions are further configured to form a database processing unit for performing database operations with data stored in the storage space structure of the nodes.

63. The computer system of claim 39, wherein the computer readable instructions are further configured to form a graphical user interface unit for inputting data for storing in the storage space structure of the nodes, and for outputting the data stored in the storage space structure of the nodes.

64. The computer system of claim 63, wherein the computer readable instructions are further configured to display the data on a computer screen.

65. The computer system of claim 61, wherein the computer readable instructions are further configured to form:
  a database processing unit for performing database operations with data stored in the storage space structure of the nodes; and
  a graphical user interface unit for displaying the database record on a computer screen.

66. A computer system comprising two or more computer systems as described in claim 39.

* * * * *

UNITED STATES PATENT AND TRADEMARK OFFICE
CERTIFICATE OF CORRECTION

PATENT NO.         : 8,271,533 B2
APPLICATION NO.    : 10/255762
DATED              : September 18, 2012
INVENTOR(S)        : Allan Williams It is certified that error appears in the above-identified patent and that said Letters Patent is hereby corrected as shown below:

In the Claims:

Column 24, line 31, "step of" should read as --the step of--.

Signed and Sealed this
Thirtieth Day of April, 2013

Teresa Stanek Rea
*Acting Director of the United States Patent and Trademark Office*